(12) United States Patent
Seo et al.

(10) Patent No.: US 7,393,516 B2
(45) Date of Patent: Jul. 1, 2008

(54) PREPARATION OF METAL CHALCOGENIDES FROM REACTIONS OF METAL COMPOUNDS AND CHALCOGEN

(76) Inventors: Dong-Kyun Seo, 2215 E. Granite View Dr., Phoenix, AZ (US) 85048; Nora Iancu, 9456 N. 83rd Pl., Scottsdale, AZ (US) 85258; Liming Wu, Building 12th, #302, Fujian Institute of Research on the Strucure of Matter, Yangqiao Xilu #155, Fuzhou, Fujian (CN) 350002

( * ) Notice: Subject to any disclaimer, the term of this patent is extended or adjusted under 35 U.S.C. 154(b) by 0 days.

(21) Appl. No.: 10/544,266

(22) PCT Filed: Feb. 2, 2004

(86) PCT No.: PCT/US2004/002929

§ 371 (c)(1),
(2), (4) Date: Jan. 10, 2006

(87) PCT Pub. No.: WO2004/073021

PCT Pub. Date: Aug. 26, 2004

(65) Prior Publication Data

US 2006/0239882 A1    Oct. 26, 2006

Related U.S. Application Data

(60) Provisional application No. 60/511,482, filed on Oct. 15, 2003, provisional application No. 60/444,078, filed on Jan. 31, 2003.

(51) Int. Cl.
   *C01B 17/00*   (2006.01)
   *C01B 19/00*   (2006.01)
   *C01G 1/00*    (2006.01)

(52) U.S. Cl. .................. 423/508; 423/509; 423/511; 423/518; 423/561.1; 423/565; 423/566.1; 423/592.1; 977/762; 977/773; 977/775; 977/777

(58) Field of Classification Search ............ 423/565, 423/508, 509, 511, 561.1, 592.1, 566.1, 518; 977/762, 773, 775, 777
See application file for complete search history.

(56) References Cited

U.S. PATENT DOCUMENTS

| 3,009,977 | A | * | 11/1961 | Houston | 136/204 |
|---|---|---|---|---|---|
| 3,770,422 | A | * | 11/1973 | Darnell | 75/370 |
| 4,208,394 | A | * | 6/1980 | Chianelli | 423/561.1 |
| 4,374,037 | A | * | 2/1983 | Takahashi | 252/301.4 S |
| 4,542,009 | A | * | 9/1985 | Palmer | 148/239 |
| 4,557,914 | A | * | 12/1985 | Modone | 423/303 |
| 4,678,584 | A | * | 7/1987 | Elfline | 210/719 |
| 4,778,539 | A | * | 10/1988 | Kubo et al. | 423/511 |
| 5,279,801 | A | * | 1/1994 | Colombet et al. | 423/21.1 |
| 5,958,281 | A | * | 9/1999 | Takada et al. | 429/305 |
| 6,303,097 | B1 | * | 10/2001 | Kinsman et al. | 423/561.1 |
| 6,835,320 | B1 | * | 12/2004 | Komatsu et al. | 252/62 |
| 2003/0190280 | A1 | * | 10/2003 | Shelton et al. | 423/565 |

OTHER PUBLICATIONS

The English abstract of CN 1251348 A published on Apr. 26, 2000.*
Feldman, Y. et al. "Bulk Synthesis of Inorganic Fullerine-like MS2 (M=Mo, W) from the Respective Trioxides and the Reaction Mechanism" Journal of the American Chemical Society, vol. 118, No. 23 (1996), pp. 5362-5367.*

* cited by examiner

*Primary Examiner*—Timothy C Vanoy
(74) *Attorney, Agent, or Firm*—Greg L. Martinez

(57) ABSTRACT

A method of preparing metal chalcogenides from elemental metal or metal compounds has the following steps: providing at least one elemental metal or metal compound; providing at least one element from periodic table groups 13-15; providing at least one chalcogen; and combining and heating the chalcogen, the group 13-15 element and the metal at sufficient time and temperature to form a metal chalcogenide. A method of functionalizing the surface of semiconducting nanoparticles has the following steps: providing at least one metad compound; providing one chalcogenide having a cation selected from the group 13-15 (B, Al, Ga, In, Si, Ge, Sn, Pb, P, As, Sb and Bi); dissolving the chalcogenide in a first solution; dissolving the metal compound in a second solution; providing and dissolving a functional capping agent in at least one of the solutions of the metal compounds and chalcogenide; combining all solutions; and maintaining the combined solution at a proper temperature for an appropriate time.

19 Claims, 17 Drawing Sheets

A

A  B  C $In_2O_3 + 2B + 4S$ ; 550°C; 2 days $3PbO + 2B + 4S$ ; 550°C; 2 days $6PbO + 4B + 8Te$ ; 450°C; 3 days $BaTiO_3 + 2B + 6S$ ; 375°C; 1 day

E $K_2CO_3 + In_2O_3 + 4B + 7S$ ; 600°C; 2 days

F $6NaF + In_2O_3 + 3B + 6S$ ; 500°C; 3 days

G $6NaF + In_2O_3 + 3B + 6Se$ ; 500°C; 3 days

H $NaBiO_3 + 2B + 4S$ ; 600°C; 2 days

A

B

C

A

B

A

B

PREPARATION OF METAL CHALCOGENIDES FROM REACTIONS OF METAL COMPOUNDS AND CHALCOGEN

CROSS-REFERENCE TO RELATED APPLICATIONS

This application claims benefit to U.S. provisional application Ser. Nos. 60/444,078 and 60/511,482, filed on Jan. 31, 2003 and Oct. 15, 2003, respectively, and International Application Number PCT/US504/02929 filed on Feb. 2, 2004.

TECHNICAL FIELD

The present invention relates to methods of synthesis of metal chalcogenides from metal compounds and period table group 13-15 elements combined with a chalcogen.

BACKGROUND ART

Because of their wide range of physical and chemical properties and unique structural characteristics, chalcogenides (sulfides, selenides and tellurides) of metals are widely used in industrial applications such as catalysis, lubrications, battery fabrication, ionic conduction, refractories, pigments, sensors, and optical and magnetic devices. Among the various preparation methods of metal chalcogenides, the simplest method to date is based on direct reactions between chalcogen elements and elemental metals at elevated temperatures. Most of the other methods utilize metathetical reactions of metal source compounds and binary chalcogenides such as $H_2S$, $H_2Se$, $H_2Te$, $CS_2$, $Y_2S_3$, $Na_2S$, $Na_2S_2$, $K_2S$ and $K_2S_2$. The reactions can take place in solid, liquid or gaseous state as well as in solution.

Discovery and utilization of new chalcogen sources are of great value for the development of new methodologies that may overcome the limitation of the current methods of chalcogenide preparation. For example, the synthesis of metal polysulfides has not been straightforward by the existing methods because many polysulfides decompose at elevated temperatures and the sources of the polyanions are relatively scarce. $H_2S$ alone is not an efficient source of $S^0$, and the thermodynamics of the thermal decomposition of $H_2S$ are not favorable at low temperatures. For instance, at temperatures below 550° C. the equilibrium concentration of sulfur is less than 1%, and even at 900° C. it is only 13%. Reactions with elemental sulfur often require a pressurized reaction container and/or a multi-step procedure. More recently, solid-state metathesis and/or solution methods have been used for the preparations of disulfides of Fe, Co, Ni, La and Pr by employing $Na_2S_2$, $K_2S_2$ or $Na_2S_5$. $FeS_2$ and $CoS_2$ have also been prepared at higher temperatures by reacting $H_2S$ with starting materials that contain the corresponding metal ions of high oxidation states, but the problem of incomplete reactions and/or of impurities still remains.

Utilization of boron chalcogenides has not been previously reported for preparation of inorganic metal chalcogenides. That is, even the most heavily studied boron chalcogenides to date, boron sulfides ($B_2S_3$, $BS_2$, and nonstoichiometric compounds with intermediate B/S ratios), have not been used in solid state syntheses other than for preparations of thioborates, and their use for sulfidation has been reported only in organic or organometallic reactions, and even there only sporadically. The sulfides do not have a well-defined melting point, but they begin to sublime at about 300° C. under vacuum from our experience as well as that of others. Previously stoichiometric $B_2S_3$ (s) vaporizes congruently to give $B_2S_3(g)$ and its polymers, while sulfur-rich samples vaporize incongruently into $(BS_2)_n(g)$ and $(B_2S_3)_n(g)$. The corrosive nature of the gaseous boron sulfides reported in the literature is probably the main reason for their scarce use in solid state reactions; and indeed the silica reaction vessels need to be heavily carbon-coated for the synthesis of alkali thioborates, which is carried out typically above 600° C. for several days.

However, for sulfidation reactions, the corrosiveness of the gaseous boron sulfides could be advantageous, particularly under low-temperature reaction conditions which are often required in preparation of nanostructural materials. Furthermore, the boron sulfides on the sulfur-rich end may allow access to the polysulfide compounds that exist only at low temperatures and decompose at elevated temperatures.

SUMMARY OF INVENTION

Disclosed herein is a method of preparing metal chalcogenides from elemental metal and metal compounds. The method includes providing at least one chalcogen, at least one element from periodic table groups 13-15 and at least one elemental metal or metal compound; and combining and heating the chalcogen, the group 13-15 element and the metal at sufficient time and temperature to form a metal chalcogenide. The chalcogen can be sulfur, selenium or tellurium.

In another embodiment, there is provided a method of preparing metal sulfides and polysulfides from metal oxides. This method includes the steps of providing boron, pure sulfur, and pure metal oxide powder; placing the boron and sulfur in a first tube; placing the metal oxide powder in a second tube; placing the two tubes into a larger container; evacuating and sealing the container; gradually heating the container to about 400-900° C.; and keeping the container at that temperature until little or no boron remains. The method turns the metal oxide into a metal sulfide polymer. This method can utilize as a metal oxide the compound $Nd_2O_3$, from which is synthesized $NdS_2$, at about 450° C. In this method a stoichiometric excess of sulfur can be placed in the first tube. The metal oxide can be selected from $TiO_2$, $V_2O_5$, $MnO_2$, $Fe_2O_3$, $Fe_3O_4$, NiO, NbO, $Nb_2O_5$, $MoO_2$, $MoO_3$, $RuO_2$, $Wo_3$, $Y_2O_3$, $Ce_2O_3$, $Nd_2O_3$, $Sm_2O_3$, $Eu_2O_3$, $Tb_4O_7$, or $Er_2O_3$. In this method, sulfur can be replaced by selenium or tellurium.

In another embodiment, there is provided a kit including boron; a chalcogenide; and, optionally, an elemental metal or a metal oxide, two small tubes, and a larger container capable of holding the tubes, the container further being capable of sealing.

In yet another embodiment, there is provided a method of preparing ultralong $TaS_3$ nanowires from tantalum metal. This method includes providing at least one piece of tantalum; providing and placing boron and sulfur in a first tube; placing the tantalum piece in a second tube; placing the two silica tubes into a container; evacuating and sealing the container; gradually heating the container to about 300-600° C.; and cooling the container to room temperature. In a variation of this method the sulfur is replaced with selenium to produce tantalum triselenide. The $TaS_3$ wire can be used as a positive anode in a battery.

In another embodiment, there is disclosed a method of preparing indium sulfide ($In_2S_3$) from $In_2O_3$. The method includes providing boron, pure sulfur, and pure $In_2O_3$; placing the boron and the sulfur in a first tube; placing the $In_2O_3$ in a second tube; placing the two tubes into a larger container; sealing the container; gradually heating the container to about 400-900° C.; keeping the container at that temperature for about two days or until little boron remains; and allowing the container to cool.

In another embodiment, there is provided a method of preparing lead sulfide (PbS) from PbO. This method includes providing boron, pure sulfur, and pure PbO; mixing and placing the boron and the sulfur in a first tube; placing the PbO in a second tube; placing the two tubes into a larger container; evacuating and sealing the container; gradually heating the container to about 400-900° C.; keeping the container at that temperature for about two days or until little boron remains, whereby the PbO turns into PbS. In this method the pure sulfur can be replaced with pure tellurium to produce PbTe.

In another embodiment, there is disclosed a method of preparing $KInS_2$ from $K_2CO_3$ and $In_2O_3$. This method includes providing boron, pure sulfur, pure $K_2CO_3$ and pure $In_2O_3$; placing the boron and the sulfur in a first tube; placing the $K_2CO_3$ and $In_2O_3$ in a second tube; placing the two tubes into a larger container; evacuating and sealing the container; gradually heating the container to about 500-700° C.; and keeping the container at that temperature for about two days or until little boron can be seen in the first tube.

In yet another embodiment, there is disclosed a method of preparing $NaInS_2$ from NaF and $In_2O_3$. This method includes providing boron, pure sulfur, pure NaF and pure $In_2O_3$; placing the boron and the sulfur in a first tube; placing the NaF and $In_2O_3$ in a second tube; placing the two tubes into a larger container; evacuating and sealing the container; gradually heating the container to about 400-600° C.; and keeping the container at that temperature for about three days or until little boron remains. Alternatively, the sulfur is replaced with selenium to produce $NaInSe_2$.

In another embodiment, there is disclosed a method of preparing $NaBiS_2$ from $NaBiO_3$. This method includes providing boron, pure sulfur and pure $NaBiO_3$; placing the boron and the sulfur in a first tube; placing the $NaBiO_3$ in a second tube; placing the two tubes into a larger container; evacuating and sealing the container; gradually heating the container to about 400-600° C.; and keeping the container at that temperature for about three days or until little boron remains.

In another embodiment, there is disclosed a method of preparing semiconducting chalcogenide nanoparticles and controlling sizes and morphologies in solution. This method includes providing a metal compound; providing at least one chalcogen selected sulfur, selenium and tellurium, and an element selected from the periodic groups 13-15 (B, Al, Ga, In, Si, Ge, Sn, Pb, P, As, Sb and Bi); contacting the metal compound and the chalcogenide solution at sufficient temperature and time to produce precipitate.

In another embodiment, there is disclosed a method of preparing semiconducting chalcogenide nanoparticles and controlling sizes and morphologies with organic capping agents by microwave heating.

In another embodiment, there is disclosed a method of preparing CdSe nanocrystals and controlling their size. This method includes providing pure $B_2Se_3$ dissolved in an amine; providing pure $CdCl_2$ dissolved in an amine; mixing the two solutions; heating the resulting solution to a temperature in the range of about 50 to 250° C. for selected reaction periods, whereby the CdSe nanocrystals form into sizes varying with the temperature and reaction period. In one embodiment of this method the heating is performed in a conventional oven or microwave. Other embodiments of this invention include heating the mixture (a) to 60° C. for 30 minutes in a conventional oven, to produce an average diameter of 2.3 nm; (b) to 60° C. for two hours in a conventional oven, to produce an average diameter of 3.4 nm; (c) to 135° C. for 5 seconds in a microwave, to produce an average diameter of 5.0 nm; (d) to 150° C. for 30 seconds in a microwave, to produce an average diameter of 5.4 nm; (e) to 200° C. for overnight in a conventional oven, to produce an average diameter of 11 nm; and to 150° C. for 30 seconds in a microwave, to produce an average diameter of 12.8 nm.

In another embodiment of the invention, there is a method of preparing CdS nanocrystals of controlled size. This method includes providing pure $B_2S_3$ dissolved in an amine; providing pure $CdCl_2$ dissolved in an amine; mixing the two solutions; and heating the resulting solution to a temperature of about 100° C. for about 40 seconds by microwave irradiation.

In another embodiment of the invention, there is disclosed a method of preparing ZnSe nanocrystals of controlled size. This method includes providing pure $B_2Se_3$ dissolved in an amine; providing pure $ZnCl_2$ dissolved in an amine; mixing the two solutions; and heating the resulting solution to a temperature of about 100° C. for about 40 seconds by microwave irradiation.

In another embodiment of the invention, there is disclosed a method of preparing PbSe nanocrystals of controlled size. This method includes providing pure $B_2Se_3$ dissolved in an amine; providing pure $PbCl_2$ dissolved in an amine; mixing the two solutions; and heating the resulting solution to a temperature of about 100° C. for about 40 seconds by microwave irradiation.

In yet another embodiment of the invention, there is provided a method of functionalizing the surface of semiconducting nanoparticles. This method includes providing at least one metal compound; providing one chalcogen, an element selected from the periodic table groups 13-15 (B, Al, Ga, In, Si, Ge, Sn, Pb, P, As, Sb and Bi); dissolving the chalcogen in a first solution; dissolving the metal compound in a second solution; providing and dissolving a functional capping agent in at least one of the first or second solution; and combining the three solutions at a proper temperature for an appropriate time. In this method the first and second solutions can be the same.

In another embodiment, there is a method of preparing CdSe nanocrystals of controlled size. This method includes providing pure $B_2Se_3$ dissolved in a polar solvent and 1,3-dimethyl-2-imidazolidinone at about a 1:50 mole ratio; providing pure $CdCl_2$ dissolved in the polar solvent and 1,3-dimethyl-2-imidazolidinone at about a 1:50 mole ratio; mixing the two solutions; heating the resulting solution to a temperature of about 70° C. for about 30 minutes in a conventional oven.

BRIEF DESCRIPTION OF FIGURES

FIG. 4B is a representative zoomed image from the top of the disks in FIG. 4A. FIG. 4C is a side view of an NdS2 nanodisk. FIG. 4D is a representative zoomed mage of the side of a NdS2 around a corner.

(FIG. 6B) and from 400° C. (FIG. 6C) reactions for 24 hours.

FIG. 12A is a representative SEM image. FIG. 12B is a representative TEM image in which the $RuS_2$ p of <20 nm diameter are aggregated. FIG. 12C is a zoomed image of the square box in 12B, showing well arranged lattice fringes.

FIGS. 18A, 18B and 18C show detail of a $TaS_3$ nanowire. FIG. 18B is an electron diffraction pattern of the $TaS_3$ nanowire. The boxed area of FIG. 18B is shown in FIG. 18C. There diffuse scattering is clearly see. $4 k_F (=C^*/2)$ corresponds to 2q, where q is the CDW nesting vector.

FIG. 28A shows the absorption and FIG. 28B shows the photoluminescence of CdSe at a 365 nm excitation wavelength.

MODES FOR CARRYING OUT THE INVENTION

Figure 1:
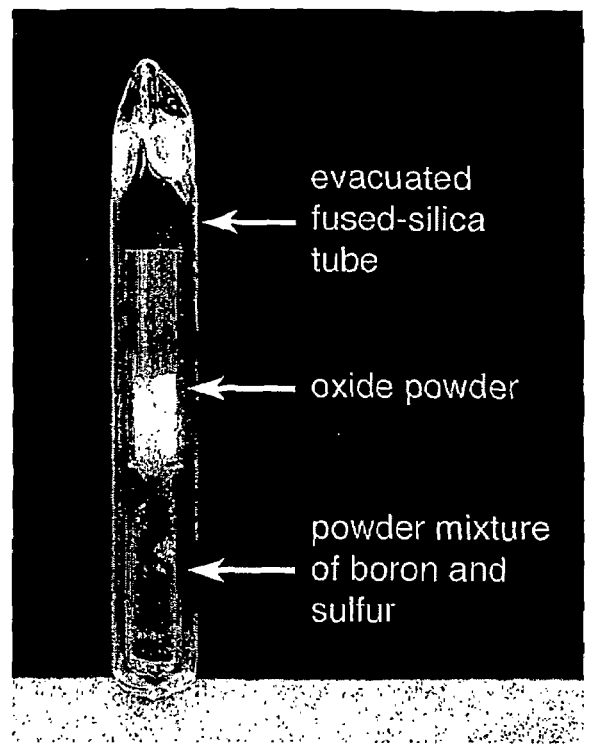
FIG. 1 shows the apparatus used to form metal chalcogenides. A fused silica tube of metal oxide powder was placed into a larger fused silica tube, followed by another fused silica tube containing a powder mixture of boron and sulfur.

In addition to boron sulfides, there are other main-group chalcogenides (defined here as the chalcogens combined with the elements of the periodic table groups 13-15) that have similar characteristics to boron sulfides. Boron selenide, $B_2Se_3$, is also corrosive in its liquid and gaseous form. No stoichiometric compounds of boron and tellurium have been reported in the literature, but experiments disclosed herein demonstrate preparation of metal tellurides because of an in situ formation of boron telluride(s) during the preparation of metal tellurides. Other main-group chalcogenides are also sources of chalcogens. For example, $Al_2S_3$, $Al_2Se_3$ and $Al_2Te_3$ readily react with moisture in air to provide $Al_2O_3$, which indicate their excellent capability of chalcogen donation. Other candidates include chalcogenide compounds that contain certain elements of the groups 13-15 (B, Al, Ga, In, Si, Ge, Sn, Pb, P, As, Sb and Bi). Although they are not as volatile as their boron analogues, those compounds can be used as chalcogen sources, particularly in solution reactions in which the chalcogenides are dissolved in proper solvents.

In this disclosure, the term "pure" is defined as at least 80%, at least 90%, more preferably at least 95%, more preferably at least 98%, more preferably at least 99%, more preferably 99.9% and most preferably 99.99%.

The phrase "little boron remains" indicates that only a small fraction of the starting material is still seen, or that no material remains in the tube into which the boron was loaded.

The disclosure of our invention is divided into two parts. The first part describes mainly the use of boron chalcogenides in solid/gas reactions to prepare various binary and ternary metal chalcogenides. The metal sources can be any type of metal-containing substances, and we show it by employing, for example, elemental metals, metal oxides, metal carbonates and metal fluorides as the metal source compounds. The second part describes the use of boron chalcogenides in solution synthesis of metal chalcogenide nanoparticles.

Part 1. Preparation of Metal Chalcogenides in Solid/Gas Reactions

We have found that boron chalcogenides are versatile sources of chalcogens that operate at intermediate temperatures in their gaseous forms. The reaction scheme is very simple and easily transferable to industrial scale synthesis. Intermediate or low temperature reaction conditions allow various nanostructures of the products. As mentioned earlier, only boron sulfides have been studied more completely compared to other boron chalcogenides, and hence the details of the reaction are described herein mainly for sulfide synthesis. However, metal selenides and tellurides also can be prepared by the same method. $B_2S_3$ does not have a well defined melting point, but begins to sublime at about 300° C. Although $BS_2$ melts congruently at 417° C. under atmospheric pressure, our experiences showed that a significant amount of $BS_2$ evaporates even at 300° C. under vacuum. While all sulfur atoms in $B_2S_3$ have a formal oxidation state of −2, the structure of crystalline $BS_2$ exhibits dimerized $S^-$ ions in addition to $S^{2-}$. The gaseous boron sulfides are corrosive in nature and indeed the preparation of boron sulfides, crystalline or vitreous (v), has been reported to require a heavy carbon-coating on silica reaction vessels over 800° C. The composition and equilibrium behavior of the boron sulfide vapor are exceedingly complex because of the existence of multiple polymeric species $S_n(g)$, $(BS_2)_n(g)$ and $(B_2S_3)_n(g)$. However, previous mass spectrometric studies have shown that stoichiometric $B_2S_3(s)$ vaporizes congruently to give $B_2S_3(g)$ and its polymers, while a B-S system richer in sulfur than $B_2S_3$ evaporates incongruently into $(BS_2)_n(g)$ and $(B_2S_3)_n(g)$ and the composition of the vapor depends on the overall ratio of boron and sulfur.

The coexistence of $S^-$ and $S^{2-}$ ions in gaseous boron sulfide species provides a unique possibility in employing boron sulfides as a sulfiding agent that can provide both of $S^-$ and $S^{2-}$ ions. Metathetical reactions of the boron sulfides are favored particularly when metal oxides are used as a metal source.

EXAMPLES

Example 1

Formation of NdS$_2$ Polysulfide Nanoparticles from Nd$_2$O$_3$ Nanoparticles

Figure 2:
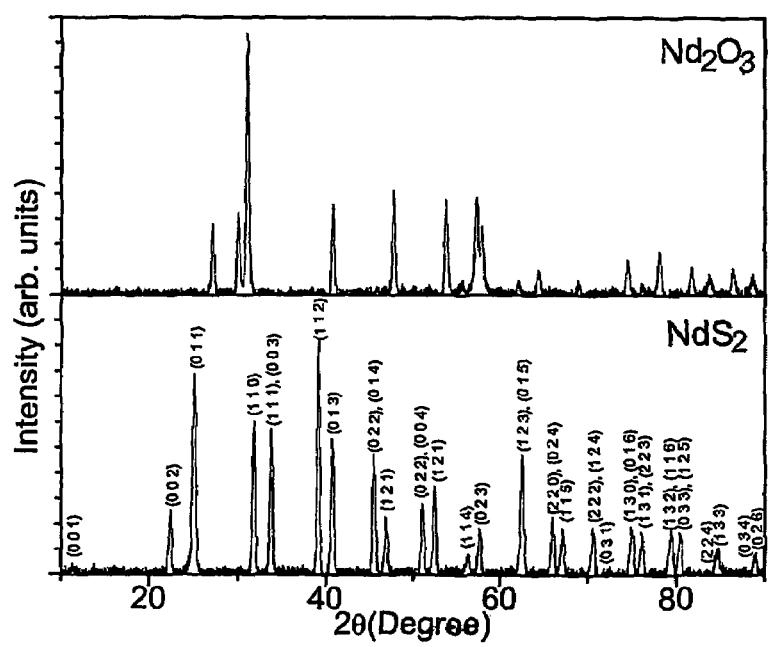
FIG. 2 shows graphs of the powder x-ray diffraction patterns of $Nd_2O_3$ and $NdS_2$.

First, 0.337 g (1 mmol) of Nd$_2$O$_3$ powder (99.9%, 49-64 nm, Nanostructured & Amorphous Materials Inc., Los Alamos, N. Mex.) was placed in a short fused silica tube (FIG. 1). Excess amounts of amorphous boron (99.99%, 325 mesh, Alfa Aesar, Ward Hill, Mass.) and sulfur powders (99.999%, Alfa Aesar) were mixed in the molar ratio of 1:4 and placed in a separate fused silica tube of the same size. The two tubes were subsequently situated inside a larger silica tube container, with the tube of Nd$_2$O$_3$ on top of the other. After the whole container was evacuated and flame-sealed, it was gradually heated to 450° C., kept at the temperature for one day, and radiatively cooled to room temperature. The pale violet color of the original oxide powder turned into grayish yellow after the reaction. The silica reaction tubes were intact, with no visible corrosion on the inner surface of the tubes. FIG. 2 compares the powder x-ray diffraction (SRD) patterns of the original Nd$_2$O$_3$ particles and the reaction product NdS$_2$ and indicates that the Nd$_2$O$_3$ was completely converted into an X-ray pure NdS$_2$ product.

Later reactions with various boron-sulfur mixtures with higher or lower sulfur contents all provided the disulfide without any other sulfides, and we found unreacted boron powder in the lower silica tube after most of our reactions. The observations imply that the gaseous boron sulfides are polysulfidic in nature. Previously it was believed that complete reactions of boron and sulfur require much higher reaction temperatures and longer reaction time. Using only elemental sulfur as a sulfiding agent under the same reaction conditions provided no sulfides, but a small amount of Nd$_2$O$_2$S and mostly unreacted oxide in the reaction products. This indicates that the initial formation of boron sulfides is essential for the sulfidation of Nd$_2$O$_3$. The overall reaction occurs as follows:

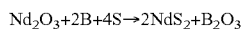

Nd$_2$O$_3$+2B+4S→2NdS$_2$+B$_2$O$_3$

Unreacted sulfur, boron sulfides, and the byproduct B$_2$O$_3$ were washed away from the product by using CS$_2$ and deionized water, and the filtered powder sample was found to be boron-free on the basis of our atomic absorption spectrometric analysis within the detection limit (5 ppm) of the instrument (Varian SpectrAA-400 Flame). Samples for high-resolution transmission electron microscopy (HRTEM) studies were prepared by dispersing a few drops of the suspensions of this powder and Nd$_2$O$_3$, respectively, in deionized water on holey carbon grids. A JEOL 4000 EX transmission electron microscope (TEM), operated at 400 kV (1.7 Å point resolution), was used to obtain HRTEM images. The crystals were oriented along various zone axes using a double-tile stage, and HRTEM images were recorded on photographic films.

Figure 3:
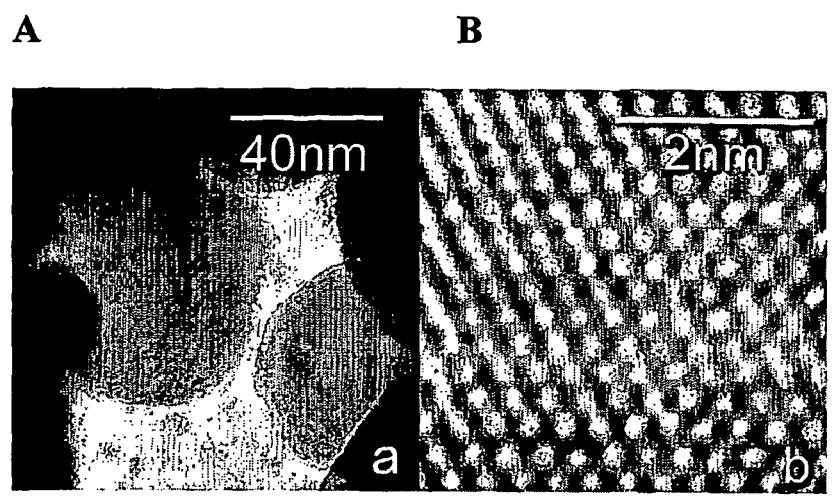
FIGS. 3A and 3B show HRTEM images of starting material $Nd_2O_3$.
Figure 4:
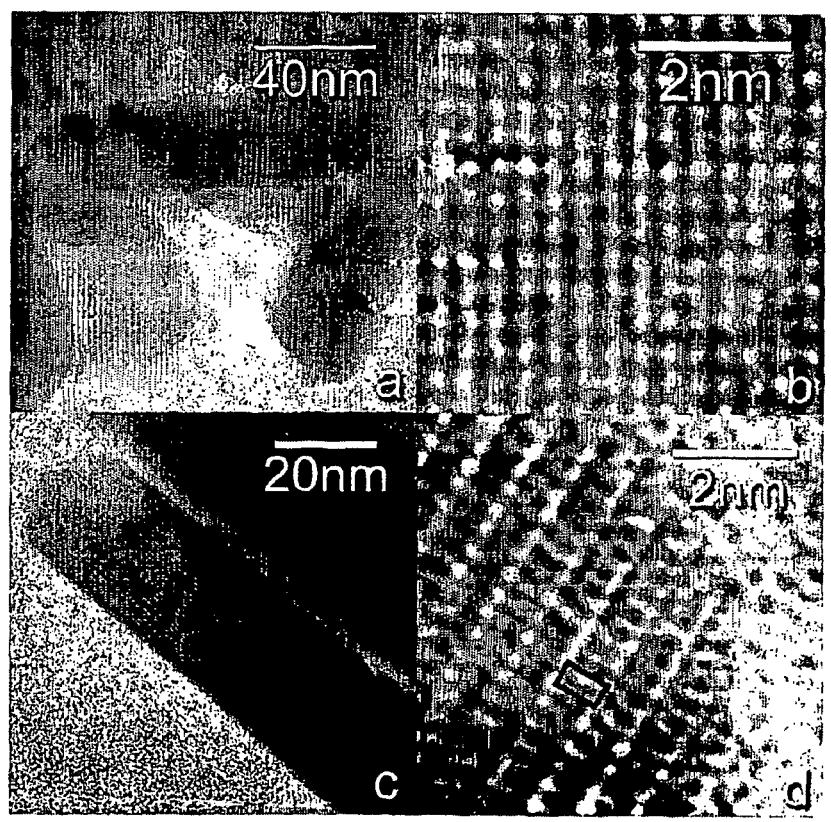
FIGS. 4A, 4B, 4C and 4D are HRTEM micrographs of NdS2 nanoparticles.

Comparison of the HRTEM images of both the Nd$_2$O$_3$ starting material and our NdS$_2$ product revealed that the original size and shape of the Nd$_2$O$_3$ were well maintained after the sulfidation process as shown in the representative images (FIG. 3B and FIG. 4A). The disk-like shape of both Nd$_2$O$_3$ and NdS$_2$ nanoparticles could result from the layer-like nature of the structures of the two compounds. A closer look in the perpendicular directions to the Nd$_2$O$_3$ nanodisks, i.e., along the <001> direction (FIG. 3B), reveals a hexagonal symmetry that reflects the atomic arrangement of the ab-plane of the Nd$_2$O$_3$ structure. The measured repeat distances (3.8 Å along the two in-plane axes) are in good agreement with the reported value of the bulk structure (a=3.8 Å). The corresponding HRTEM images of the NdS$_2$ nanodisks oriented along the <001> directions (FIG. 4B) reveal atomic positions well arranged in a square lattice with a repeat distance of 4.0 Å, which is consistent with the a-spacing (4.022 Å) of the unit cell of the bulk NdS$_2$. In FIG. 4C, a nanocrystal with thickness of about 30 nm is oriented along the <010> direction, and the high magnification image is shown in FIG. 4D.

This experiment demonstrated that with boron sulfide as the sulfiding agent, nanoparticles of Nd$_2$O$_3$ were successfully converted into nanoparticles of NdS$_2$, at unprecedented low temperatures, without continuous flow or pressurization of sulfiding gases such as H$_2$S or elemental sulfur.

Example 2

Conversion of the Nanoparticles of Rare-Earth Oxides (Tb$_4$O$_7$, Ce$_2$O$_3$, Sm$_2$O$_3$, Er$_2$O$_3$ and Eu$_2$O$_3$) into the Nanoparticles of their Corresponding Disulfides (TbS$_2$, CeS$_2$, SmS$_2$, ErS$_2$ and EuS$_2$)

Figure 5:
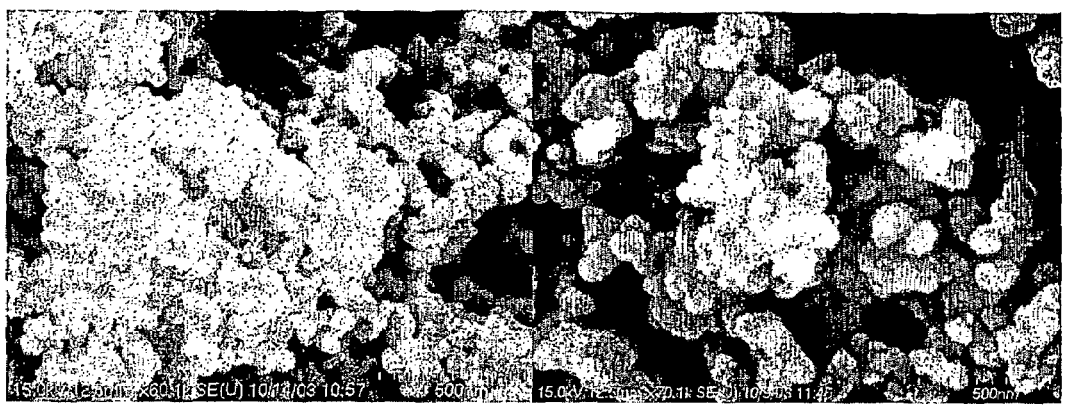
FIGS. 5A and 5B are SEM of nanoparticles of $TbS_2$ (FIG. 5A) obtained from $Tb_4O_7$ nanoparticles (FIG. 5B).
Figure 6:
FIGS. 6A, 6B and 6C are SEM of nanoparticles of $Ce_2O_3$ (FIG. 6A) and $CeS_2$ from 450° C.

The preparation method of NdS$_2$ nanoparticles from Nd$_2$O$_3$ nanoparticles was applied to other rare-earth oxide nanoparticles with success. The products were all fine powders of the pure sulfides after sulfidation reactions at the temperature range between 350 and 550° C. The scanning electron microscopic (SEM) images of the products showed that the particle sizes varied significantly from 30 nm to ~1 μm, and the sizes were smaller when the reaction temperature was lower. FIGS. 5-9 show the SEM images of the various nanoparticles. FIG. 5 lows nanoparticles of TbS$_2$ (IA) from Tb$_4$O$_7$ nanoparticles (FIG. 5; average size=45-60 nm in diameter). The loaded molar ratio was Tb$_4$O$_7$:B:S=3:14:24. The preparation was heated at 450° C. for 24 hours. FIG. 6 shows nanoparticles of starting material Ce$_2$O$_3$ (FIG. 6A; average size=20-50 nm) and CeS$_2$ products from 450° C. (FIG. 6B; ~250 nm) and 400° C. (FIG. 6C; ~90 nm) ions for 24 hours. The loaded molar ratio was Ce$_2$O$_3$:B:S=1:2:4. All the images are in the same scale.

Figure 7:
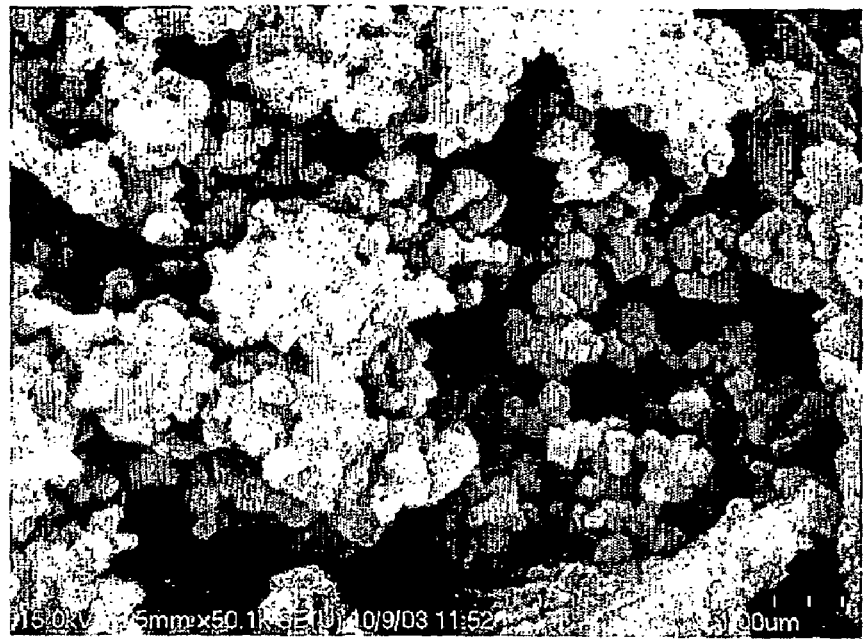
FIG. 7 is an SEM of $SmS_2$ nanoparticles (~80 nm).
Figure 8:
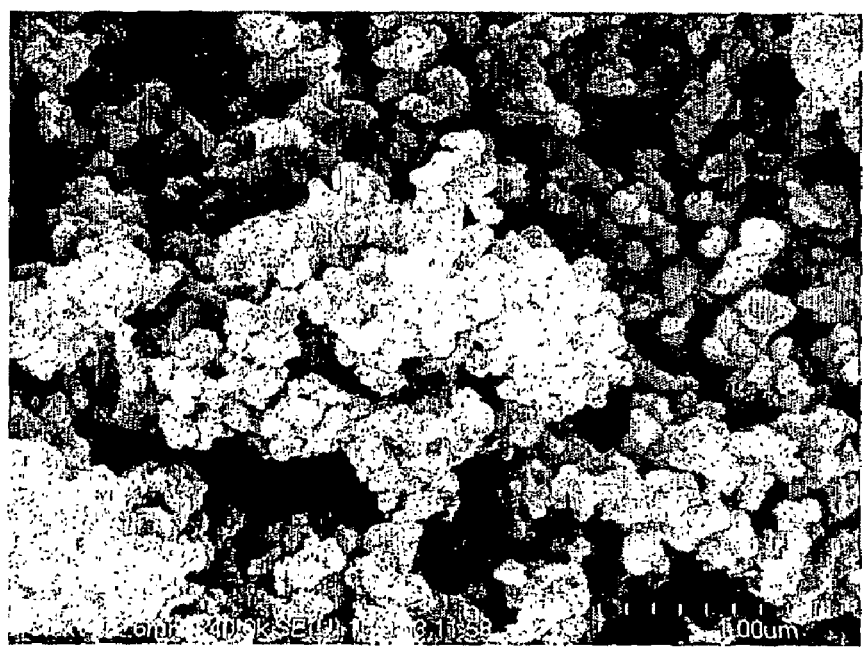
FIG. 8 is an SEM of $ErS_2$ nanoparticles (~100 nm).
Figure 9:
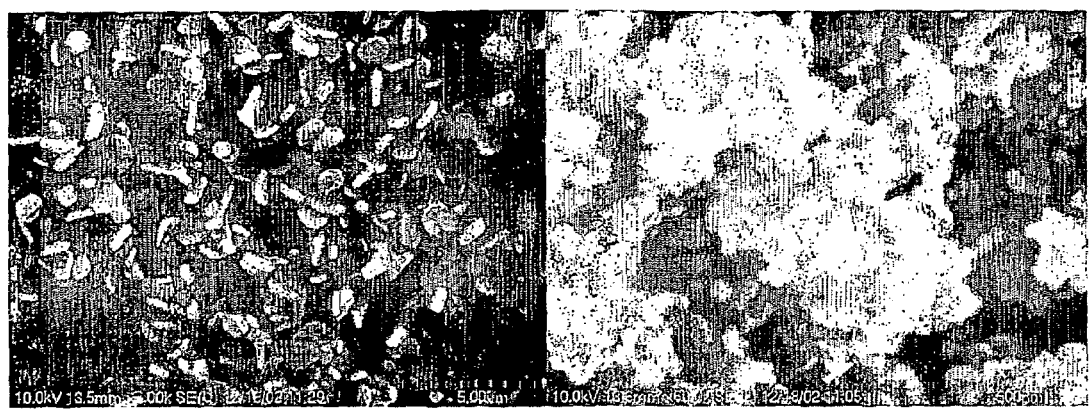
FIGS. 9A and 9B are two SEM of disk-shaped nanoparticles of $EuS_2$ (FIG. 9A) which were synthesized from $Eu_2O_3$ nanoparticles (FIG. 9B).

FIG. 7 shows nanoparticles of SmS$_2$ (~80 nm) obtained from Sm$_2$O$_3$ nanoparticles (30-40 nm in diameter). The loaded molar ratio was Sm$_2$O$_3$:B:S=1:2:4. The preparation was heated at 450° C. for 24 hours. FIG. 8 shows nanoparticles (~100 nm) of ErS$_2$ synthesized from Er$_2$O$_3$ nanoparticles (40-55 nm in diameter). The loaded molar ratio was Er$_2$O$_3$:B:S=1:2:4. The preparation was heated at 450° C. for 24 hours. FIG. 9 shows disk-shaped nanoparticles of EuS$_2$ (FIG. 9A; diameter: ~900 nm; thickness: ~200 nm) from Eu$_2$O$_3$ nanoparticles (FIG. 9B; 45-60 nm). The magnification of FIG. 9B is ten times that of FIG. 9A. The loaded molar ratio was Er$_2$O$_3$:B:S=1:2:4. The preparation was heated at 450° C. for 24 hours.

Example 3

Synthesis of Metal Polysulfides and Sulfides (TiS$_2$, TiS$_3$, VS$_4$, FeS$_2$, NiS$_2$, NbS$_3$, MoS$_2$, RuS$_2$, WS$_2$, Y$_2$S$_3$, RS$_2$ (R═Ce, Nd, Sm, Eu, Th and Er), In$_2$S$_3$, PbS, PbTe, BaTiS$_3$, KInS$_2$, NaInS$_2$, NaInSe$_2$, NaBiS$_2$) from their Binary and/or Ternary Oxides at Intermediate Temperatures Amorphous boron powder (99.99%, 325 mesh), sulfur powder (99.999%) and metal oxides (99.9% or higher) were purchased from Alfa Aesar. The reaction materials in the scale of mmol were loaded in a glove box or in air. In a general reaction scheme, a metal oxide in powder was placed in a short fused silica tube (FIG. 1). Stoichiometric amounts of boron and sulfur powders were mixed and placed in a separate fused silica tube of the same size. The reactant ratios were chosen to provide the most sulfur-rich phases in the phase diagrams at the designated reaction temperatures. To ensure a complete reaction of metal oxides, sulfur was loaded 10% more than the stoichiometric amounts. The two tubes were subsequently situated inside a larger silica tube container (10 mm ID), with the tube containing the metal oxide on top of the other (FIG. 1). After the whole container was evacuated and flame-sealed, it was gradually heated at 50° C./h to the designated reaction temperature, kept for 24 hours, and was subsequently cooled radiatively to room temperature. The reaction conditions and results are summarized in Table 1. After the reactions, the lower tube was empty, which indicated complete consumption of boron. The silica reaction tubes were intact, with no visible corrosion on their inner surfaces. The products were cleaned several times with $CS_2$ and deionized water (or methanol) to wash off unreacted sulfur, boron sulfides and the byproduct $B_2O_3$. The clean powder samples were found to be boron-free based on our atomic absorption spectrometric analysis within the detection limit (5 ppm) of the instrument (Varian SpectrAA-400 Flame, Palo Alto, Calif.). The phase identification was carried out from the powder X-ray diffraction patterns obtained by using a Siemens X-ray diffractometer (Munich, Germany). The JADE program (version 6.1.3; Severna Park, Md.) was used for the unit cell refinements. The lattice parameters were matched with the values from the literature usually within much less than 0.2% for all the sulfide products except for $CeS_2$ (0.5% for the b-axis). All the products were X-ray pure without any impurities including the starting materials, as found from their powder patterns (see Table 1). SEM/EDX analysis was conducted on a Hitachi S-4700-II high-resolution scanning electron microscope (Schaumburg, Ill.), and the obtained compositions were well in agreement with the previously reported data.

Example 4

Transition Metal Chalcogenides

The oxidation states of the transition metal ions in the starting materials range from +6 to +2, and the boron sulfides either reduce or oxidize the metal ions into the stable oxidation states in the corresponding polysulfides and sulfides (Table 1). The sulfidation reactions of $TiO_2$ at two different temperatures provided different phases, $TiS_3$ (at 300-450° C.) and $TiS_2$ (at 800° C.), both in a pure form. The loaded ratio of boron and sulfur also affected the formation of $TiS_2$ and $TiS_3$. The lattice parameters of our $TiS_2$ product indicate that its S/Ti ratio is close to 1.94 due to a sulfur deficiency in the structure. This nonstoichiometry is consistent with the previous studies in which the same amount of sulfur deficiency was found in the most sulfur-rich product from the reactions between the elements at 800° C. In TEM images of the sample from the reactions (not shown), nanoparticles (<40 nm) and nanorods (~120 nm wide and >3 µm long) were found. The layered structure of $TiS_2$ makes the compound suitable for use as a high-temperature lubricant and electrode material for high-density lithium batteries.

Figure 10:
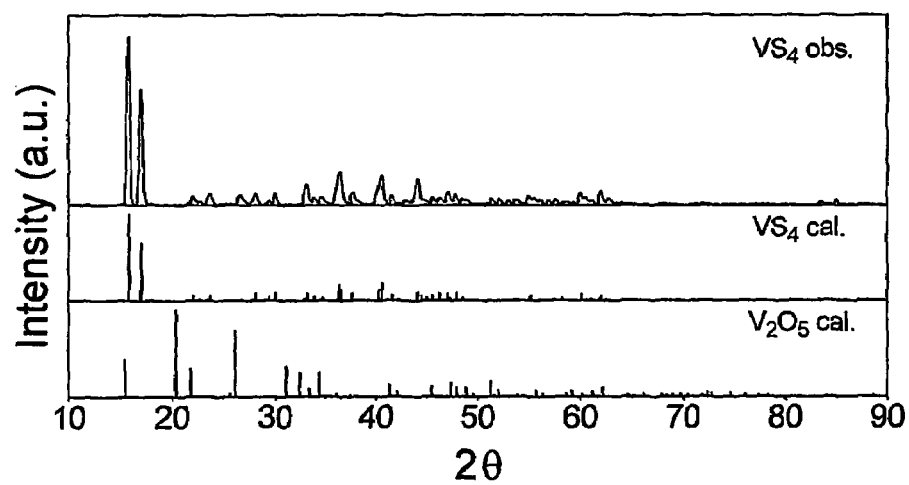
FIG. 10 displays XRD graphs of the observed and calculated $VS_4$ and of the calculated $V_2O_5$.

Our successful formation of $VS_4$ is notable because previous; attempts at $VS_4$ synthesis have not been very successful, partly due to its decomposition above 400° C. $V_5S_8$ appears to be the most sulfur-rich vanadium sulfide that can be prepared by the reactions between the elements. $V_2S_3$ has been used to prepare crystalline $VS_4$ by the reaction with elemental sulfur at 400° C., but the sulfidation was incomplete even after a four-week reaction period. By utilizing the boron sulfide method, however, $V_2O_5$ could be converted to pure $VS_4$ at 350° C. within 24 hours, as found from the X-ray powder diffraction pattern of the product in FIG. 10, which matches well with the previous data. The starting oxide powder needed to be well dispersed on the surface of the reaction container, otherwise, the initial formation of a thin layer of a black melt at the top of the oxide sample prohibited a complete sulfidation of the material underneath.

Figure 11:
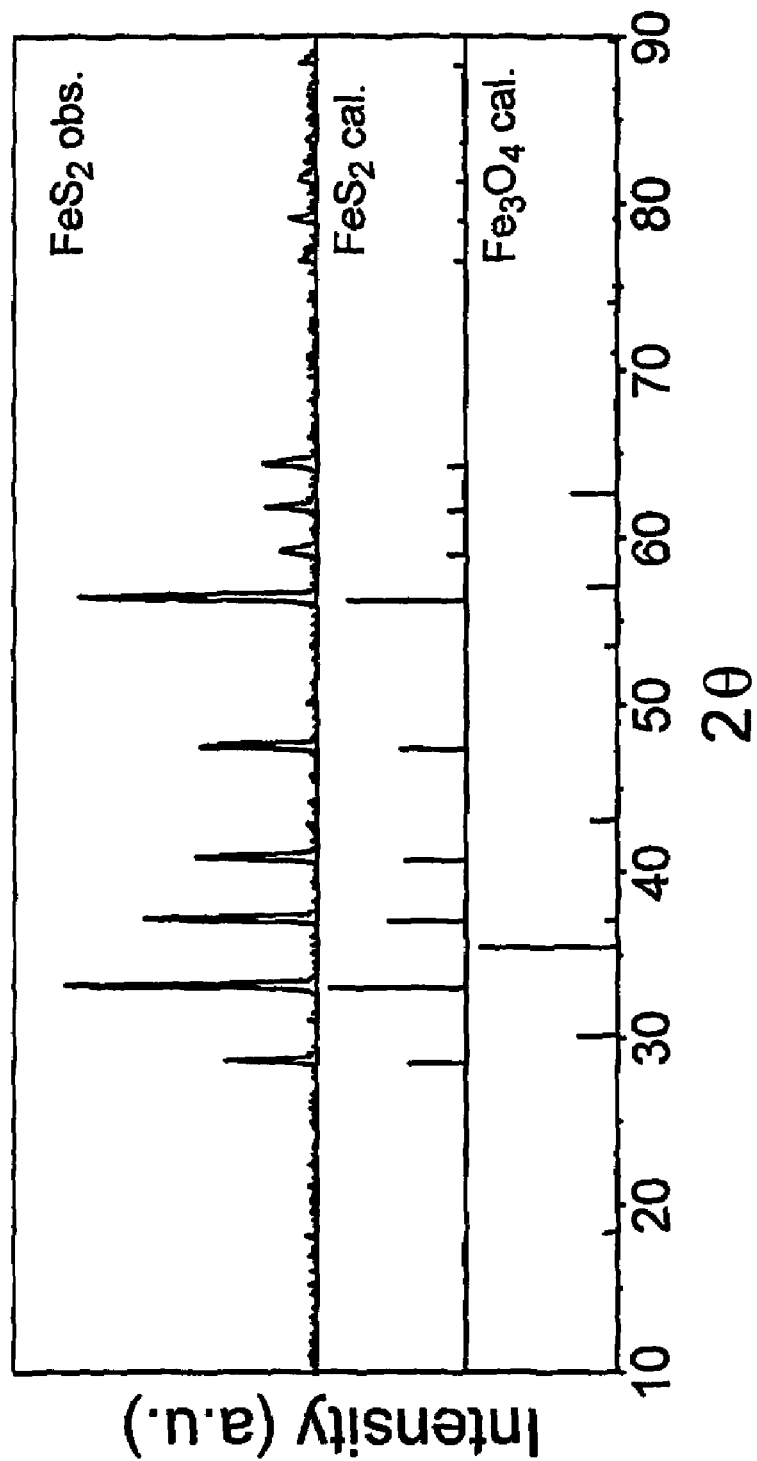
FIG. 11 displays XRD graphs of the observed and calculated $FeS_2$ and of the calculated $Fe_3O_4$.

Numerous synthetic methods have been proposed for pyrite, $FeS_2$, because of its importance in recent thermal battery and lithium primary battery applications. $FeS_2$ poses problems because it starts to lose sulfur above 550° C. and decomposes at 743° C. In addition, it transforms into a marcasite structure below 445° C. The reaction between the elements has not been successful. The reactions of $FeCl_2$ or $Fe_2O_3$ with $H_2S$ are not complete for the temperature region where the pyrite structure is stable. Low-temperature solution synthesis in previous studies often resulted in amorphous products and/or the marcasite phase as an impurity. FIG. 11 shows the X-ray powder diffraction patterns of the products from the reactions of $Fe_3O_4$ with appropriate amounts of boron and sulfur that were carried out at 550° C. The procedure produced pure pyrite nanoparticles of about 200 nm in diameter. The patterns matched well with the calculated powder pattern of $FeS_2$, and did not exhibit any Bragg reflection peaks of the starting oxides. Both of the patterns matched well with that of the previously known stoichiometric pyrite, and no impurities were observed. The same reaction procedure was conducted at 450° C., which limited the average particle size to less than 50 nm.

The sulfidation of NiO and $RuO_2$ also provided pure $NiS_2$ and $RuS_2$ of the pyrite-type structure under the same reaction condition for the $FeS_2$. The calculated unit cell parameters are in agreement with those of the known stoichiometric compounds. An isotypic compound, $MnS_2$, is not stable under our reaction condition, and decomposes into α-MnS (rock-salt structure) around 260° C. Two other polymorphic forms (β: zinc blend; γ: wurtzite) are known, but only α-MnS is thermodynamically stable. It is reasonable, therefore, that our sulfidation of MnO at 550° C. provided pure α-MnS as the product, and the refined unit cell parameters match well with the known values.

Figure 12:
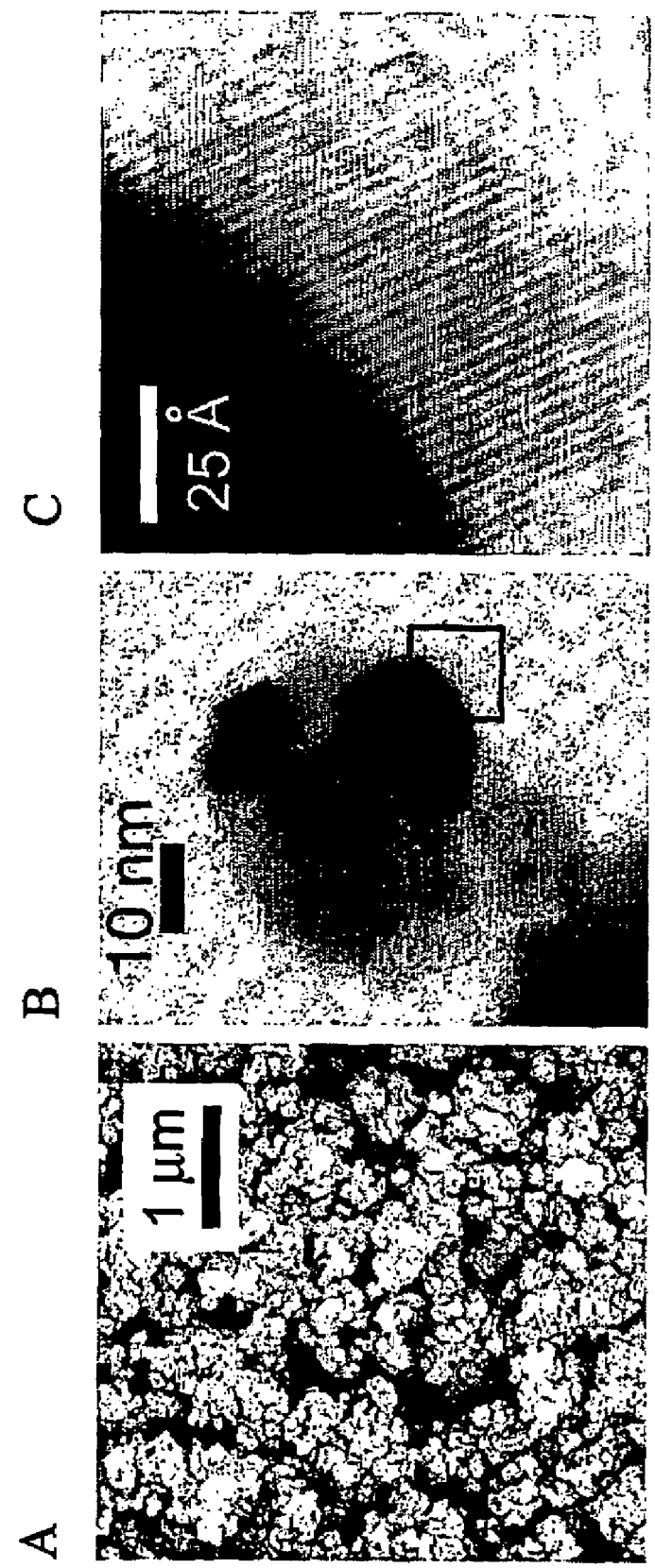
FIGS. 12A, 12B and 12C are photomicrographs of $RuS_2$.
Figure 13:
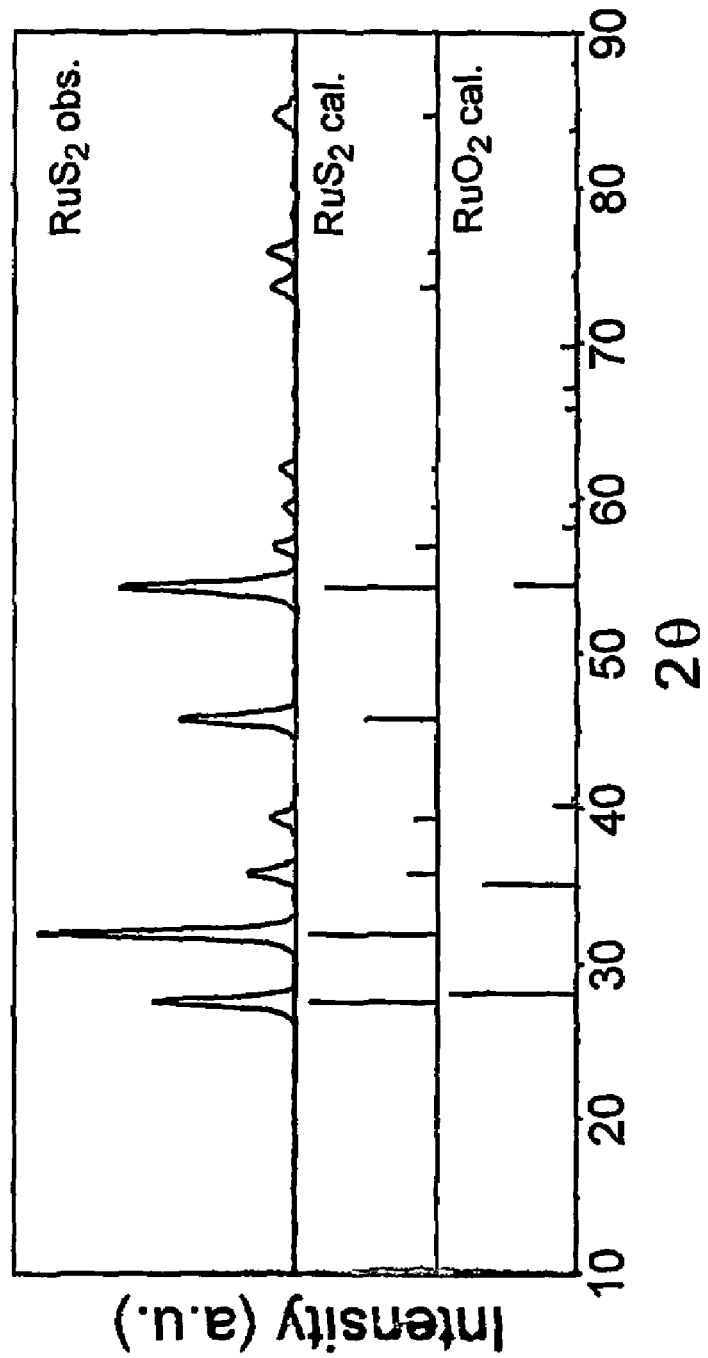
FIG. 13 displays XRD graphs of the observed and calculated $RuS_2$ and of the calculated $RuO_2$.

Interestingly, the $RuS_2$ product was found to consist of nano-sized particles (<15 nm), as indicated from our SEM (FIG. 12A) and TEM studies (FIGS. 12B and 12C). FIG. 12A is a representative SEM image of the $RuS_2$ product. FIG. 12B is a representative TEM image of the $RuS_2$ product in which the $RuS_2$ particles of <20 nm diameter are aggregated. FIG. 12C is a zoomed image of the square box in FIG. 12B. The well arranged lattice fringes indicate good crystallinity of the $RuS_2$ nanoparticles. The Bragg reflection peaks in the X-ray powder diffraction pattern of the product (FIG. 13) were very broad, and the estimated average particle size was 13 nm, which is consistent with the findings in our electron microscopy studies. X-ray powder diffraction pattern of the product from the reaction of $RuO_2$ matched well with the calculated powder pattern of $RuS_2$, and did not exhibit the Bragg reflection peaks of the starting $RuO_2$. The Bragg reflection peaks were broad with an estimated particle size of 13 nm. The starting $RuO_2$ particles (Alfa Aesar) were very small as well, with the average diameter of 26 nm as estimated from our powder diffraction. It is suspected that the high melting point of $RuS_2$ (>1200° C.) did not allow a significant fusion of the sulfide particles once they were formed initially, and hence afforded RuS$_2$ particles much smaller than the original oxide particles. The particle size of our RuS$_2$ product is in fact much smaller than the particle sizes (<50 nm) in a previous report in which crystalline RuS$_2$ nanoparticles were obtained after annealing of the amorphous product from the aqueous reaction of RuCl$_3$ and H$_2$S.

It is emphasized that these sulfidation reactions were efficient regardless of the initial oxidation states of the metal atoms in the starting materials. For instance, both Fe$_2$O$_3$ and Fe$_3$O$_4$ provided FeS$_2$, with proper amounts of boron and sulfur to react with. Such flexibility in selection of starting materials is demonstrated more dramatically in our preparation of NbS$_3$. In addition to Nb$_2$O$_5$, sulfidation was also carried out by employing NbO (Nb$^{2+}$) because of the extensive Nb—Nb bonds in its structure which contrasts with Nb$_2$O$_5$ in which Nb atoms are in a filly oxidized state (Nb$^{5+}$). Under exactly the same reaction temperature, nevertheless, both the oxides provided pure NbS$_3$ (Nb$^{4+}$) as indicated from the X-ray powder diffraction analysis (Table 1). In other words, by controlling the loading ratios of boron and sulfur, the Nb atoms could be oxidized or reduced during the sulfidation processes. The nanoscopic structural nature of the NbS$_3$ product was striking. The reaction products both from NbO and Nb$_2$O$_5$ exhibited a fiber-like morphology, and some of the products were found on the surface of the silica jacket outside of the container in which the original oxide was located, while most of the product remained in the container.

Figure 14:
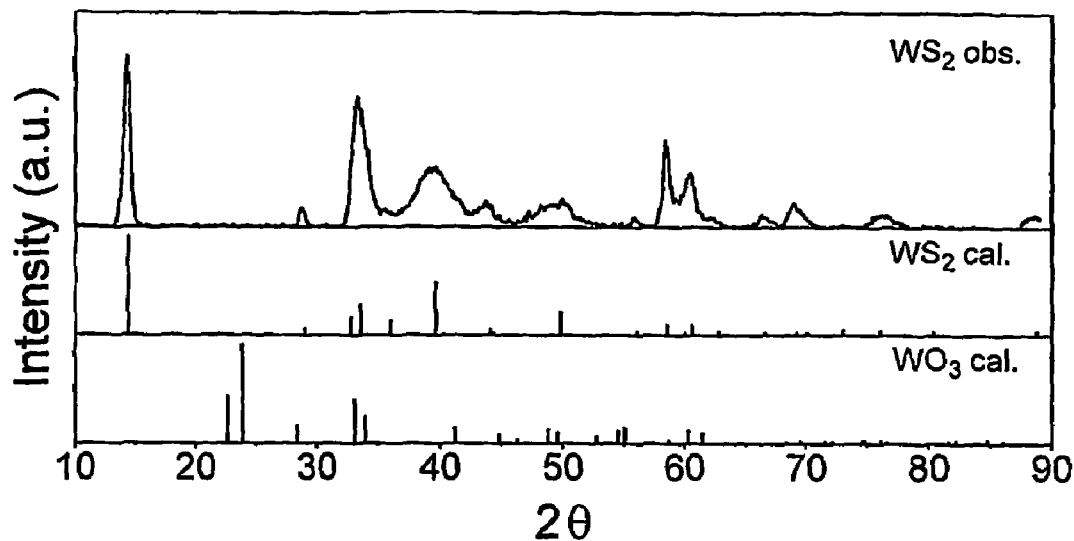
FIG. 14 displays XRD graphs of the observed and calculated $WS_2$ and of the calculated $WO_2$.

Tungsten metal wire (0.2 mm in diameter and about 5 cm long) was sulfidized completely into WS$_2$ at 600° C. in 24 hours. The product maintained the original shape of the tungsten wires, but with a roughly doubled thickness. Sublimation of the remaining boron sulfides and sulfur and/or washing in water provided the disulfide nanomaterials with a purity higher than 99.9%. Sublimation of the remaining boron sulfides and sulfur and/or washing in water provided the disulfide nanomaterials with a purity higher than 99.9%. MoS$_2$ and WS$_2$ did not exhibit sulfur-sulfur bonds, and yet were the most sulflur-rich crystalline phases in their binary phase diagrams. Solution reaction routes have provided sulfur-richer WS$_5$ and MoS$_x$ (x=5-6) in an amorphous state. FIG. 14 shows the X-ray powder diffraction patterns of the products from WO$_3$ obtained from the boron sulfide reactions at 550-600° C.

Figure 15:
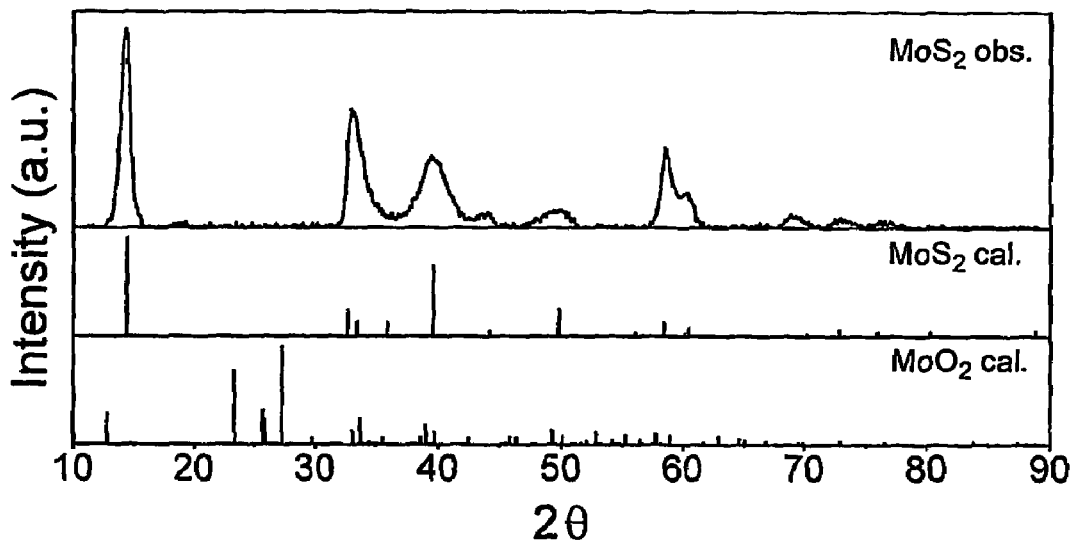
FIG. 15. displays the XRD graphs of the observed and calculated $MoS_2$ and of the calculated $MoO_2$.
Figure 16:
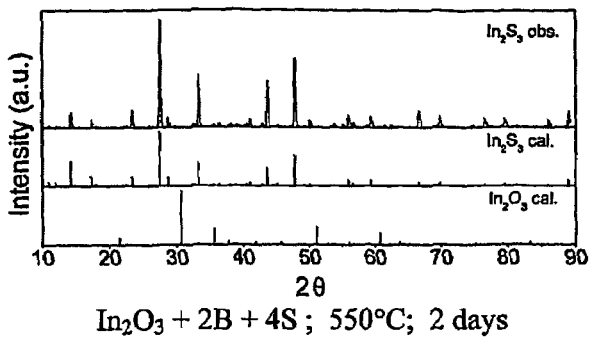
FIGS. 16A-16H is a series of XRD graphs for the products and starting materials shown in each figure.
Figure 16:
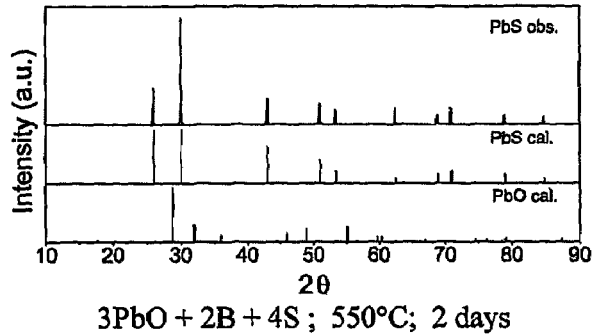
Figure 16:
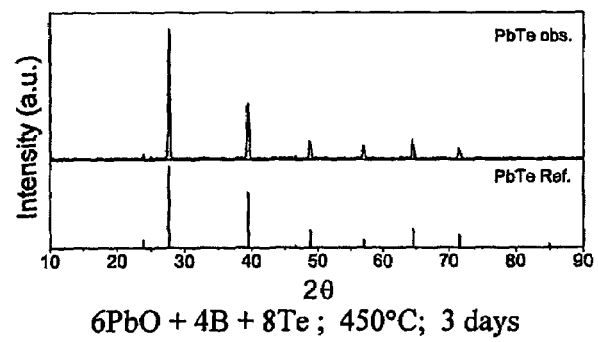
Figure 16:
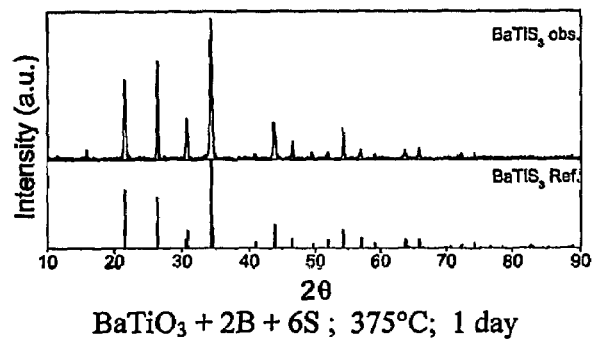
Figure 16:
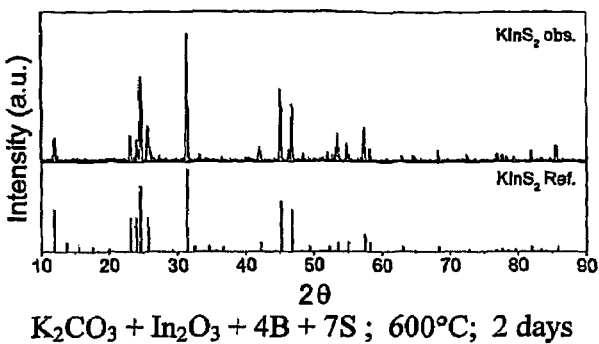
Figure 16:
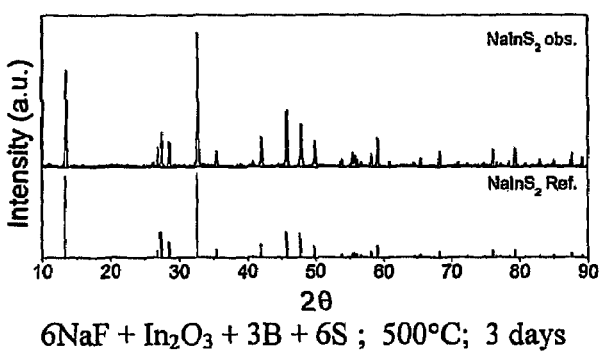
Figure 16:
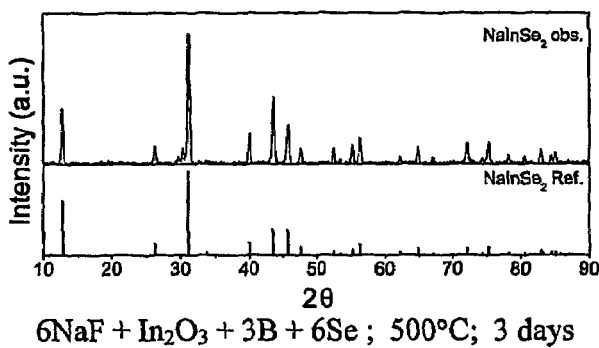
Figure 16:
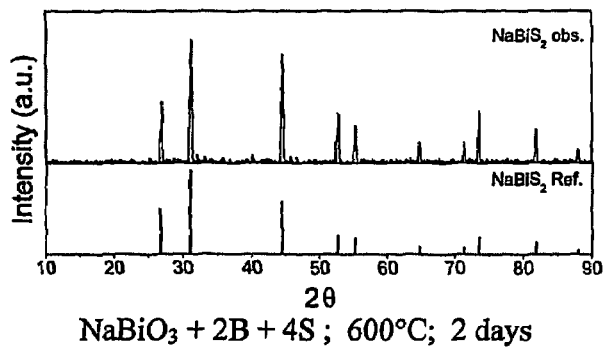

The MoS$_2$ product from MoO$_3$ showed a powder pattern (FIG. 15) similar to WS$_2$. The Bragg reflection peaks were broad, comparable to previous studies based on various reaction routes, and yet the relatively sharp (002) reflection peaks (2θ~14°) imply that the disulfide layers were well stacked. No impurities were found in the powder patterns. Although not shown here, the tungsten and molybdenum products from the reactions at 800° C. showed essentially the same broad peaks in the X-ray powder patterns, yet with sharper (002) reflection peaks. Sublimation of the remaining boron sulfides and sulfur and/or washing in water provided the disulfide nanomaterials with a purity higher than 99.9%. WS$_2$ and MoS$_2$ show numerous desirable properties in the fields of catalysis, electrocatalysis, electrochemical intercalation and lubrication. For efficient use of their chemical properties, the WS$_2$, and MoS$_2$ materials need to be prepared with high surface areas, and hence the nanostructures with high surface areas described herein are highly desirable.

Example 5

Rare-Earth Metal Disulfides and Sulfides

All the rare-earth metal elements form disulfides as the most sulfur-rich phase in their binary system, although the stability and compositional range of the disulfides can vary with different metal elements. In particular, YS$_2$ has been prepared only with high-pressure conditions (>35 kbar) over 500° C., and the disulfides of heavy rare-earth metals (Eu—Yb) exhibit significant sulflur deficiencies (5-15%). The reaction of La and Nd oxides with H$_2$S has been reputed to begin at 700° C.; however, the reaction temperature could be lowered to 500° C. in a high-pressure environment. In the previous studies, crystals of the rare-earth disulfides formed in low yield when the corresponding sesquisulfides were treated with elemental sulfur over 600° C. LaS$_2$ and PrS$_2$ have been prepared from the reactions of the corresponding chlorides and bromides with K$_2$S$_2$ at temperatures as low as 300° C.

In our experiments (Table 1), the sulfidation reactions of R$_2$O$_3$ (R=Y, Ce, Nd, Sm, Eu and Er) and Tb$_4$O$_7$ with boron sulfides resulted in pure products of metal disulfides at 550° C., with the exception of the Y$_2$O$_3$. The reaction of Y$_2$O$_3$ at 550° C. provided Y$_2$S$_3$ with a large amount of unreacted starting material after a 24-hour reaction period. The same reaction condition at 800° C. produced pure Y$_2$S$_3$. The powder X-ray diffraction patterns matched well with the ones from the literature for all the rare-earth disulfides and sulfides. The compositions obtained from the EDX studies are also in a good agreement with the literature, in that the light rare-earth disulfides (R=Ce and Nd) were stoichiometric (within±0.2%), while significant amounts of sulfur deficiency were found in the samples of the heavy rare-earth disulfides (SmS$_{1.93}$, EuS$_{1.91}$, TbS$_{1.88}$ and ErS$_{1.87}$). These values correspond to the lower limits found in literature reports. The refined unit cell parameters also matched well with literature values, with a maximum deviation of 0.5% and typically with deviations below 0.2% (Table 1). The lattice parameters in the literature are rather scattered because of synthetic problems as well as structural changes by nonstoichiometries and synthetic conditions.

Scope of the Method

As shown supra, the new sulfidation method was found to be efficient for various metal oxide compounds that contain transition metals, or rare-earth metals in different oxidation states. Although not described here, other experiments indicated that the reaction temperatures can be varied without much difference in the results. In another set of experiments for polysulfide synthesis, reactions were repeated with the amounts of sulfur less than required for the stoichiometric reactions. The results were the incomplete sulfidation that still provided polysulfides. However, this left some oxides unreacted, rather than the formation of the corresponding sulfides with less sulfur content. Regardless of the chemical nature of the metal oxides, therefore, the reaction products were indeed the most sulfur-rich compounds that are expected thermodynamically at the reaction temperatures.

In a simplified picture, the reaction procedures can be broken down into two subsequent reactions described by the following equations, and it is noted that the formation of boron sulfides in the first step is not necessarily complete before the second step proceeds:

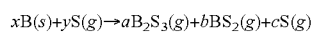

$x$B($s$)+$y$S($g$)→$a$B$_2$S$_3$($g$)+$b$BS$_2$($g$)+$c$S($g$)

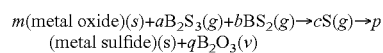

$m$(metal oxide)($s$)+$a$B$_2$S$_3$($g$)+$b$BS$_2$($g$)→$c$S($g$)→$p$ (metal sulfide)($s$)+$q$B$_2$O$_3$($v$)

While this new sulfidation method utilizes solid-gas reactions between the metal source and gaseous boron sulfides, there is a striking difference between the new method and the traditional solid-gas synthesis based on the sulfiding gases, H$_2$S and CS$_2$. In the new method, the reactions are loaded with all solid-state materials (metal source, boron and sulfur) in a closed container. Given a target sulfide, the starting materials are mixed at appropriate ratios, and the reaction proceeds to completion until the starting materials are all consumed. There is no need of a continuous, and sometimes prolonged, flow of a sulfidizing gas for a complete reaction; and the risk of harmful gases can be minimized. In this regard, the new method resembles the sulfidation reaction between elements, i.e., metal and sulfur. Differently from sulfur, however, boron sulfides can act as either a reducing or oxidizing agent, depending on the oxidation states of the metal ions in the starting materials and the loaded ratios of boron and sulfur. In addition, the in situ preparation of boron sulfides is greatly advantageous over the expensive $Y_2S_3$ method in industrial applications; i.e., the boron powder may not even need a high purity. When the impurities, mostly magnesium in industrial boron powder, react with sulfur, the resulting sulfides are expected to remain in the original container because of their typically high boiling point, while only boron sulfides evaporate to react with the metal source compounds in a separate container.

The precise role of boron in the reaction mechanism is not clear yet; nevertheless, the obvious benefit of boron is that the co-product of the reactions, $B_2O_3(v)$, is strongly favored thermodynamically. This affords the same benefit as the well established alkali sulfide solid-state metathesis method, which is based on the simple exchanges of ions during reaction processes driven by the large enthalpy of formation of alkali halides, the co-product. However, the reaction mechanism in the boron sulfide metathesis could be more complicated because the boron sulfides may react in the form of gaseous molecules, as $H_2S$ does in its much studied sulfidation processes. This argument is supported by the large difference in the bond enthalpies between B—O and B—S (228 kJ/mol).

As demonstrated in our experiments, the newly found use of boron sulfides offers a convenient route to synthesize a broad range of crystalline metal polysulfides and sulfides in a pure form at intermediate temperatures. We believe that the mild reaction conditions also can play an important role in preparation of nanostructured materials of such compounds, as indicated by our recent work on preparation of $NdS_2$ nanoparticles. We are currently extending our work to other various metal-source materials that contain different ligands, with a preliminary success. Furthermore, we have shown that the same preparative technique is effective for polyselenides and selenides as well, because boron selenides react similarly to boron sulfides.

Example 6

Synthesis of $In_2S_3$, PbS, PbTe, $BaTiS_3$, $KInS_2$, $NaInS_2$, $NaInSe_2$ and $NaBiS_2$ Using the above-described 3-vessel method, we have extended our preparation to other sulfides, selenides and tellurides, which are not necessarily nanosized after the reactions. The same method has been tested to provide $In_2S_3$, PbS, PbTe, $BaTiS_3$, $KInS_2$, $NaInS_2$, $NaInSe_2$, and $NaBiS_2$ from their corresponding binary or ternary oxides as well as other types of metal sources such as fluorides and carbonates. It is emphasized that the method is applicable not only for metal oxides but also for various other kinds of metal source compounds, as exemplified with fluorides and carbonates. The X-ray powder patterns of the products are shown in FIGS. 16A-16H with the reaction conditions. This work proves that our method is broadly applicable and can be used to prepare various binary and multinary compounds that contain chalcogen elements.

Example 7

Preparation of Ultralong $TaS_3$ Nanowires from Tantalum Metal

Figure 17:
FIG. 17 is an SEM image of $TaS_3$ hairy wires and their bundles growing from the surfaces of the Ta metal piece in the reaction container.
Figure 18:
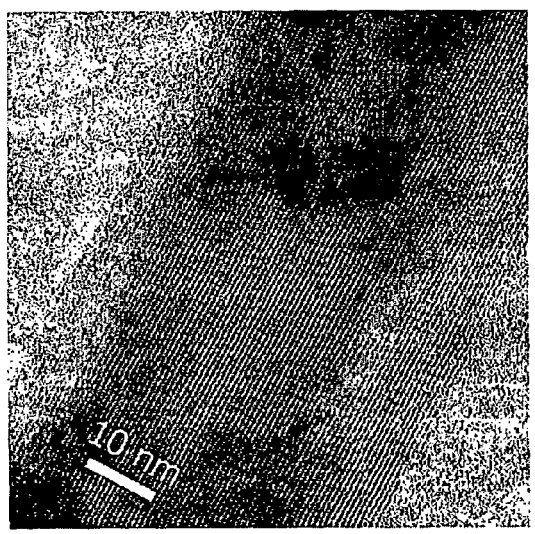
FIG. 18 A is a side view of a typical wire.
Figure 18:
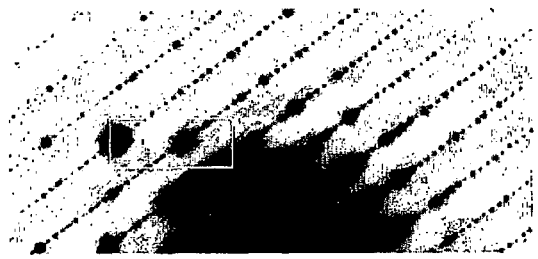
Figure 18:
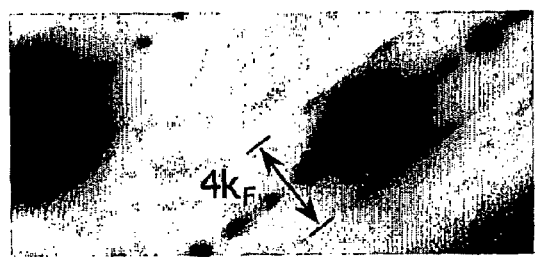

The reactions of Ta thin metal pieces to produce with $B_2S_3$ at 400-500° C. resulted in bundles of nanowires of $TaS_3$ that grew from the surface of the metal pieces (FIG. 17). The wires were 10-200 nm wide along the transverse direction, and their length varied from several microns, to millimeters, even to several centimeters, depending on the synthetic conditions. FIGS. 18A, 18B and 18C show detail of a TaS3 nanowire. FIG. 18A shows a nanowire of about 45-50 nm width. FIG. 18B shows further details of the diffraction pattern of the same wire. FIG. 18C shows diffuse scattering of detail of FIG. 18B. Bundles of wires longer than 2 cm were quite common, and we once observed hairy bundles (<0.01 mm wide) that were longer than 5 cm. We obtained similar results for $TaSe_3$ and $NbSe_3$. The fibrous structure provides particularly desirable characteristics for battery applications because of the high surface area. The test results in 1970s on the batteries with these fibrous trisulfides as a positive electrode showed that those batteries maintained a large fraction of their capacity after being recharged a large number of times, and also provided attractive capacities.

Example 8

Preparation of $MoS_2$ Plate-Like Nanocrystals from Mo Nanoparticles

We prepared nanoparticles of $MoS_2$ from commercial molybdenum nanoparticles (~100 nm, Aldrich). The molybdenum nanoparticles were originally kept in hexane to void their oxidation. An appropriate amount of the nanoparticles were taken out and dried in air. The molybdenum nanoparticles were then loaded in the scale of mmol in a nitrogen-filled glove box. The nanoparticle powder was placed in a short fused silica tube. Boron and sulfur powders were mixed and placed in a separate fused silica tube of the same size. The loaded ratio of molybdenum:boron:sulfur was 1:1:6 in moles. The two tubes were subsequently situated inside a larger silica tube container (10 mm ID), with the tube containing the metal powder on top of the other. After the whole container was evacuated and flame-sealed, it was gradually heated at 50° C./h to the designated reaction temperatures between 450 and 850° C., kept for 24 hours, and was subsequently cooled down radiatively to room temperature. The maximum reaction temperature 850° C. is much lower than the decomposition temperature of the target compound (1750° C.). Even with the presence of boron sulfide vapor in the container during the reactions, there was no visible corrosion of silica surfaces.

Figure 19:
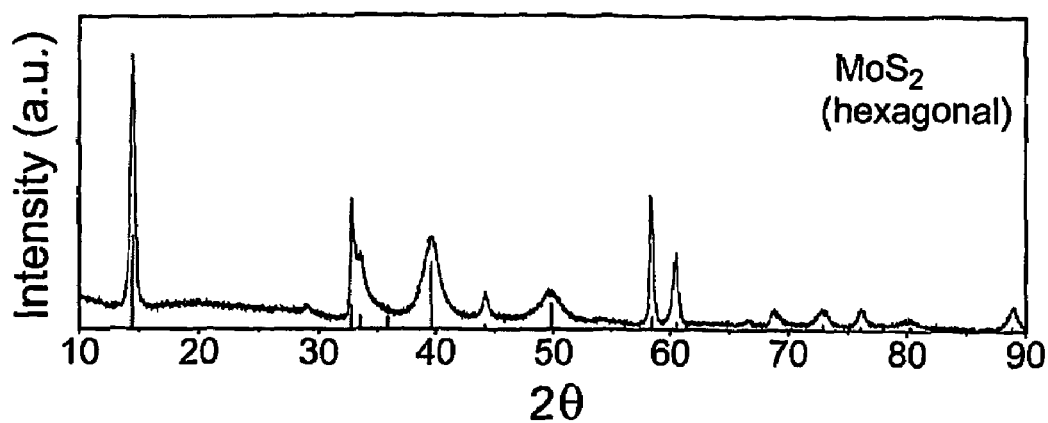
FIG. 19 is an x-ray diffraction pattern of the $MoS_2$ prepared at 850° C. and matches well with the calculated powder pattern (solid vertical lines) of hexagonal $MoS_2$.

The products were cleaned several times with $CS_2$ and deionized water (or methanol) to wash off unreacted sulfur and boron sulfides. The final product was a very fine powder with an excellent lubricating property. FIG. 19 shows the X-ray powder diffraction pattern of the product obtained from the boron sulfide reaction at 850° C. The Bragg reflection peaks were relatively sharp, and the very sharp (002) reflection peaks (2θ~14°) imply that the disulfide layers stacked very well, which is consistent with the observed lubricating property. Although not shown here, the products from the reactions at lower temperatures show broader Bragg reflection peaks.

Figure 20:
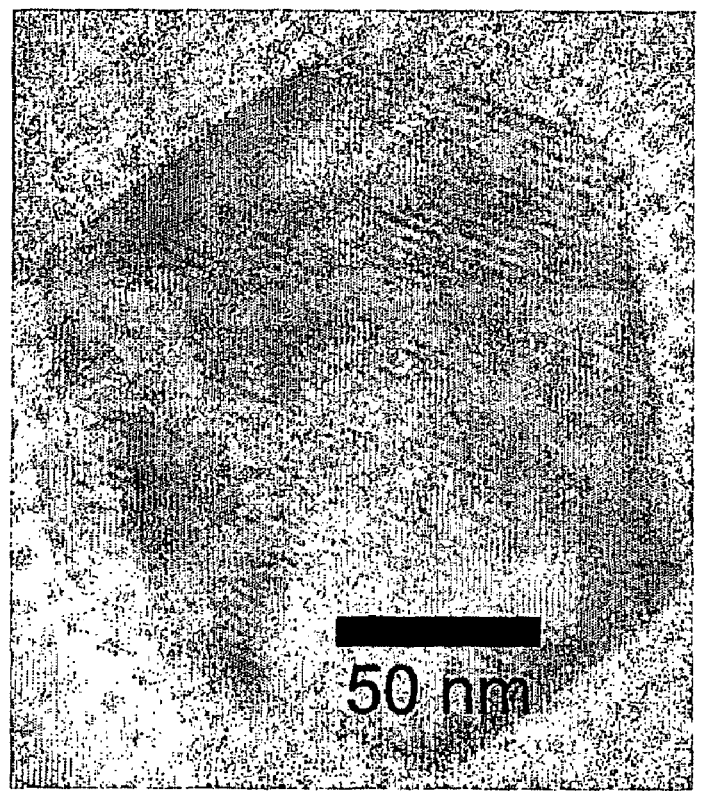
FIG. 20 is a high-resolution TEM micrograph of a MoS2 crystalline plate.

Subsequent TEM studies showed that the $MOS_2$ powder consists of plate-like particles whose lateral dimension ranges from 100 to 700 nm. We could not determine the thickness of the plates due to their strongly preferred orientation. FIG. 20 shows a high resolution TEM image of a relatively small hexagonal $MoS_2$ plate with an excellent crystallinity which is important for providing the good lubricating property of the $MoS_2$. It is believed that our sulfidation method could be utilized for sulfidation of other metal nanoparticles into their corresponding metal sulfide nanoparticles in good crystallinity. The hexagonal shape and Moire pattern on the face of the particle imply good crystallinity.

Part 2. Preparation of Size-Controlled Semiconducting Nanoparticles in Solution

Since the discovery of quantum confinement effect in semiconducting nanoparticles, many applications of the new materials have been found in the areas of energy conversion, electronics, optics, and sensors. Because of the high demand for the materials, much effort also has been devoted to develop efficient preparative methods that can control the sizes and shapes of them. We have found that main-group chalcogenides can be versatile sources of chalcogens in amine that allowed us to invent a new simple, size-selective synthetic method that can utilize a closed reaction container heated either in a conventional oven or by microwave irradiation. No currently-existing methods employ main-group chalcogenides as a chalcogen source. For example, most of the existing preparative methods involve dissolution and reaction of sulfur or selenium by employing a TOP/TOPO (tri-octylphosphine/tri-octylphosphine oxide) solution at rather high temperatures, often much above the flash point of the solvent. In a different preparative route, custom-designed inorganic clusters have been used as a Cd/Se single-source precursor in hot hexadecylamine solution. A recently-reported low-temperature large-scale syntheses of semiconducting metal-sulfide nanocrystals in oleylamine (9-octadecenylamine), from the corresponding metal chlorides and elemental sulfur. Oleylamine forms a complex with metal ions and also allows to control the growth of metal-sulfide nanocrystals from the reaction of the metal ions and the dissolved sulfur. Although effective, this approach is not viable for metal-selenide nanocrystals because of the insolubility of elemental selenium in amines.

Our new synthetic method based on the good solubility of boron selenide in amines is useful with various metal sources and different amines. We expect that $Al_2S_3$, $Al_2Se_3$ and $Al_2Te_3$ and other main-group metal chalcogenides can be used as an alternative source of chalcogens. Our invention is a new method that involves dissolution of a solid-state chalcogen source in an appropriate solvent and the consequent reaction of the chalcogen source with a metal source compound in solution.

Example 9

Preparation of Size-Controlled CdSe Nanocrystals

First, boron selenide ($B_2Se_3$) was synthesized by heating a stoichiometric mixture of boron (99.99% pure, Alfa Aesar) and selenium (99.999% pure, Alfa Aesar) in a carbon-coated and evacuated fused silica tube at 850° C. for 24 hours. $B_2Se_3$ is air sensitive and it generates $H_2Se$ by reacting with moisture. All the loading of the reactions was carried out in a nitrogen-gas-filled glove box. In a typical reaction, 0.15 g (0.58 mmol) of the prepared $B_2Se_3$ was dissolved in 10 ml oleylamine (70%, Aldrich) and heated to 115° C. in a closed container to ensure a complete dissolution. At the same temperature, in a separate container, 0.31 g (1.7 mmol) of $CdCl_2$ (99% pure, Alfa Aesar) was also dissolved in 10 ml oleylamine. These two solutions were cooled to room temperature and remained clear, with no sign of precipitate. The two solutions were mixed at room temperature at a proper volume ratio to provide the correct stoichiometry for the target product, and the mixed solution remained clear. No chemical reaction was observed to take place at room temperature. The solution mixture was taken from the glove box in a closed flask, was heated gradually to 60-200° C. for different reaction periods between 10 seconds and two hours, and then quenched.

Specifically, the different conditions were as follows: (a) 60° C. for 30 minutes, conventional oven; (b) 60° C. for two hours, conventional oven; (c) 135° C. for 5 seconds, microwave (CEM Discover System, Buckingham, UK); (d) 150° C. for 30 seconds, microwave; (e) 200° C., overnight, conventional oven; and (f) 150° C. for 30 seconds, microwave. At 60° C., the solution changed its color suddenly, which indicated the initiation of nucleation, and the growth of the particles are much slower (on the order of hours) and more controllable, which is advantageous over the earlier methods in which the particles fully form within several minutes. Thus, there is more controllable quenching of the growth and higher product yield. The flask was opened in air.

Figure 21:
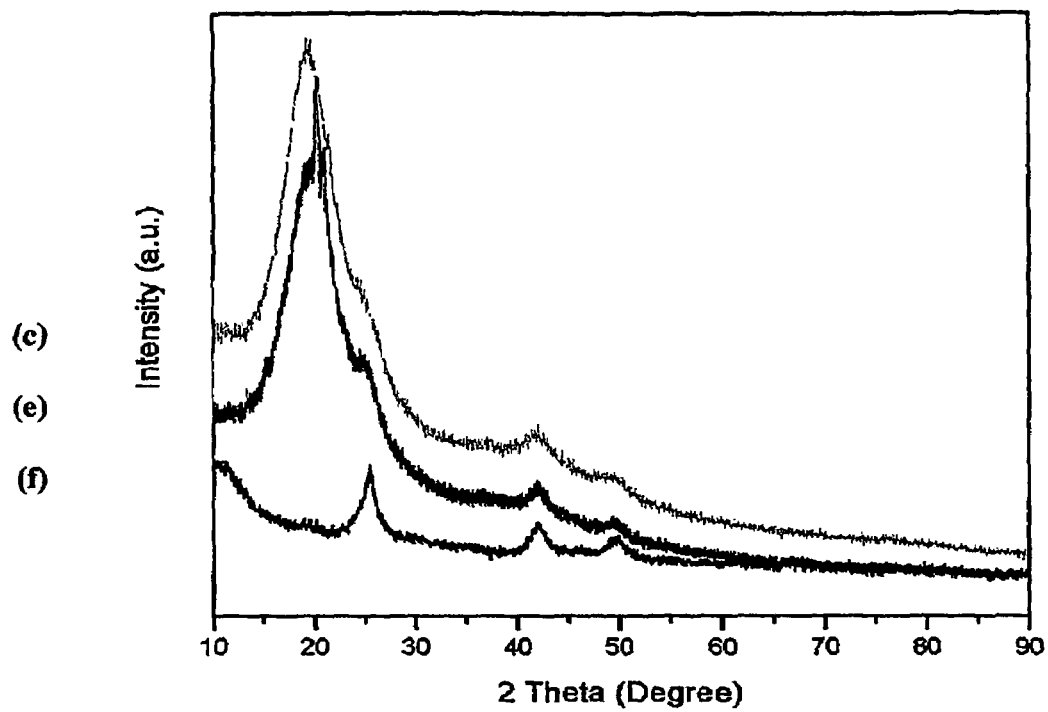
FIG. 21 shows three XRD patterns of samples c., e., and f.

The X-ray diffractions (XRD) patterns of three samples (prepared as described above for (c), (e) and (f)) are shown in FIG. 21. The Bragg reflections at $2\theta=26$, 42 and 49° indicate that the products exhibit a good crystallinity, purely with a zinc-blend structure, and that there is no presence of the wurtzite structure. The preference of the zinc-blend structure has been noted previously in the previous amine solution synthesis. It is noted that we also have observed coexistence of zinc-blend and wurtzite structures in our experiments, but the former structure has always been prevalent. The large broad peak around 20° does not match with any of the known Bragg peaks of CdSe structures, and hence may be due to solvent and/or other by-products in the sample. The x-ray powder diffraction patterns indicated pure zinc-blend type CdSe structure.

Figure 22:
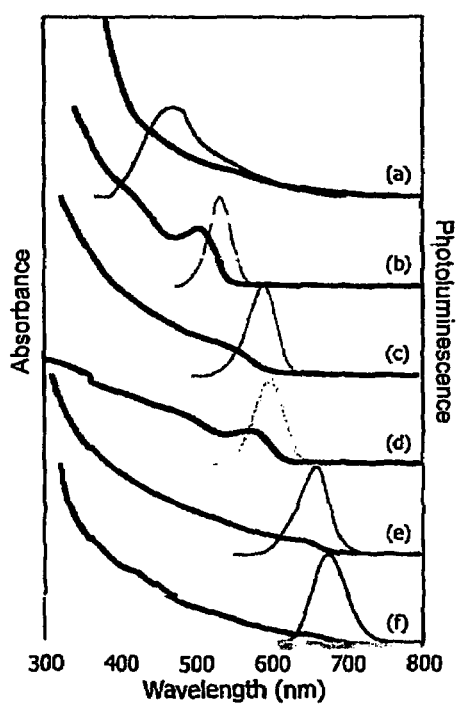
FIG. 22 shows absorption (wide, thick graphs) and photoluminescence patterns (peaks) for CdSe nanocrystals in cyclohexane.

An appropriate portion of ethanol was added to the product solution to flocculate and to precipitate the CdSe nanocrystals. The precipitate was retrieved by centrifugation at 3000 rpm and redispersed in cyclohexane. After purification, the nanoparticles could be redispersed in cyclohexane. UV-Vis spectra were recorded using a Shimadzu UV-2100U spectrophotometer (Columbia, Md.) and the photoluminescence (PL) experiments were carried out on a MD-5020 PTI spectrometer. The PL spectra were measured using a 350 nm excitation wavelength and were normalized to their intensity for comparison at an arbitrarily chosen wavelength, 450 nm (FIG. 22). In FIG. 22, the emission peaks are bell-shaped and red shifted compared to the corresponding absorption peaks. The photoluminescence size distributions are relatively narrow for samples (b)-(f) with the FWHM of their PL emission peaks ranging from 35 to 55 nm. However, sample (a) exhibits a very broad emission peak. The PL quantum yield was obtained using a conventional method by integrating the PL band of CdSe in cyclohexane and comparing the intensity to that of Rhodamine B in ethanol. The minimum quantum yield was found to be 3% for (f) and 5% for (a), in agreement with previous studies.

Figure 23:
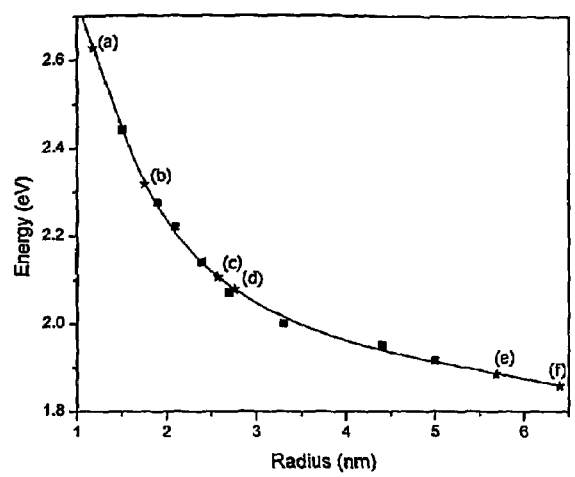
FIG. 23 displays a curve used to estimate the sizes of CdSe particles. PL emission energy is graphed against the radius.

The PL spectra were used to estimate the sizes of the nanocrystals in our samples because the absorption peaks at the band edge were not strong enough to be used for the size determination. In FIG. 23, an semiempirical relationship between PL energy and particle radius is shown in solid line that was obtained by fitting the literature data (squares) with a simple model proposed by Brus. It was assumed that the PL energy is proportional to the absorption energy at the band edge. From the observed PL energies of our samples (stars in FIG. 23), the estimated average diameters are (a) 2.3 nm; (b) 3.4 nm; (c) 5.0 nm; (d) 5.4 nm; (e) 11 nm; (f) 12.8 nm. The TEM studies of the samples are currently in progress to directly examine the sizes and to investigate the shapes and morphologies of the nanoparticles from our synthetic conditions.

In conclusion, we have shown that our new simple synthetic method yields size-controlled photoluminescent CdSe nanocrystals. Owing to the good solubility of boron selenide in amines, the new method can operate at relatively lower temperatures, and the particle sizes can be controlled easily by adjusting heating methods, and reaction periods and temperatures. The method is promising for a large-scale preparation, as we observed in a separate experiment that by successive microwave irradiations with intermittent cooling, the concentration of CdSe nanoparticles could be significantly increased without a considerable change in the PL energy.

Example 10

Preparation of Semiconducting CdS, ZnSe and PbSe Nanoparticles in Oleylamine

Figure 24:
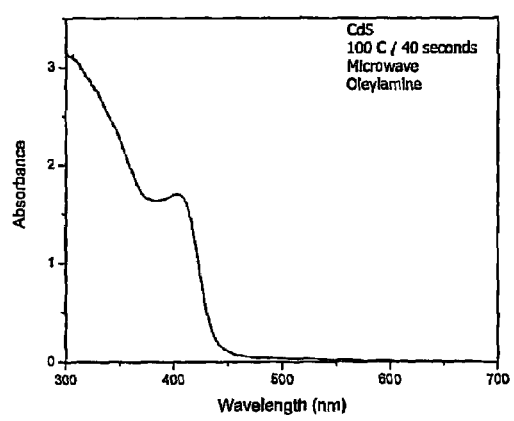
FIGS. 24A and 24B show the absorption and photoluminescence (respectively) of CdS nanoparticles prepared in a DMI solution.
Figure 24:
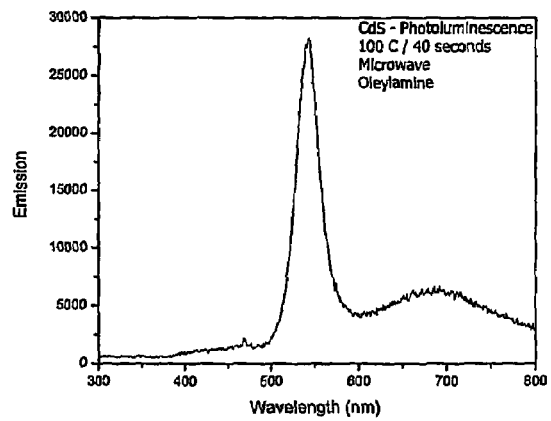
Figure 25:
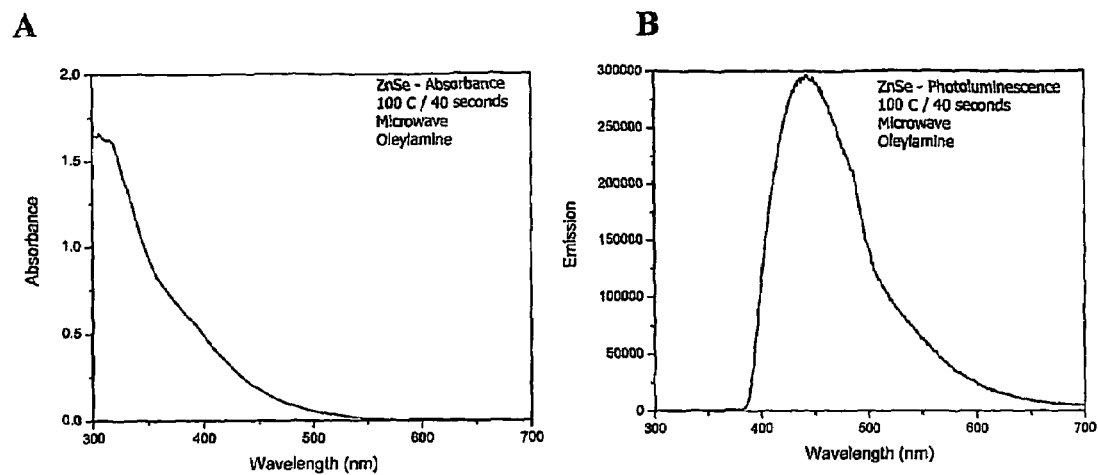
FIGS. 25A and 25B show the absorption and photoluminescence (respectively) of ZnSe nanoparticles.
Figure 26:
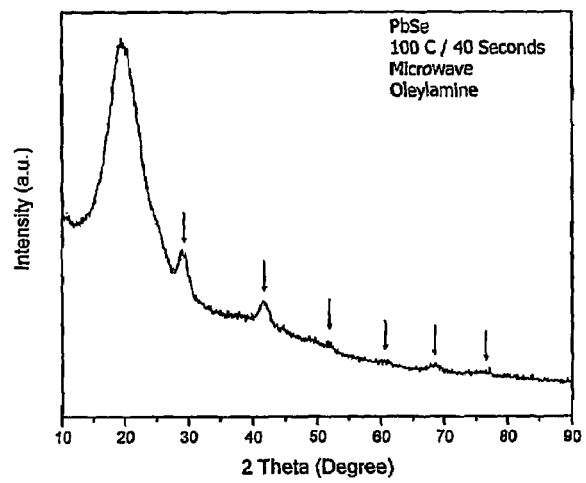
FIG. 26 shows an XRD pattern for PbSe in oleylamine.

As an extension of our work on CdSe nanoparticles, we have successfully shown that the same method yields nanoparticles of CdS, ZnSe and PbSe. As evidence, we provide the optical absorption and photoluminescent spectra of CdS (FIGS. 24A and 24B) and ZnSe (FIGS. 25A and 25B), and the X-ray powder diffraction pattern of PbSe (FIG. 26). The spectra of CdS and ZnSe nanoparticles were measured using a 365 nm excitation wavelength. In the XRD pattern of the PbSe sample, the arrows indicate the theoretical positions of the Bragg reflections of PbSe in a rock-salt structure. The optical spectra were taken after the standard purification procedure, and the X-ray studies were done before the purification step. The optical studies of PbSe will include infrared absorption and emission. The synthetic conditions are the following:

(a) CdS nanoparticles
Preparation of cadmium solution: 0.234 g $CdCl_2$ in 5 ml oleylamine.
Preparation of sulfur solution: 0.05 g $B_2S_3$ in 5 ml oleylamine.
Heating of the mixed solution: microwave irradiation at 100° C. for 40 seconds
(b) ZnSe nanoparticles
Preparation of zinc solution: 0.157 g $ZnCl_2$ in 5 ml oleylamine.
Preparation of sulfur solution: 0.1 g $B_2Se_3$ in 5 ml oleylamine.
Heating of the mixed solution: microwave irradiation at 100° C. for 40 seconds
(c) PbSe nanoparticles
Preparation of lead solution: 0.74 g $PbCl_2$ in 5 ml oleylamine.
Preparation of selenium solution: 0.1 g $B_2Se_3$ in 5 ml oleylamine.
Heating of the mixed solution: microwave irradiation at 100° C. for 40 seconds Example 11

Functionalization of the Surface of Semiconducting Nanoparticles in Noncoordinating Solvent Proper organic capping agents around nanoparticles hold the key to future technological applications of nanostructures based on their self-assemblies. In the area of gold metal nanoparticle research, great progress has been made for such functionalization, mainly because the thiol capping agents can be easily replaced by other functional thiols after the synthesis. However, the functionalization of semiconducting nanoparticles such as CdSe has not been straightforward. It is because the capping agents are rather tightly bound to the surfaces of those nanoparticles, and hence the replacement is not as easy as in the case of gold-thiol nanoparticles. One way of solving the problem is utilization of functional capping agents as a coordinating solvent at the synthetic step so that the replacement of the capping agent is not necessary afterwards. The limitation of such an approach is the fact that many useful organic capping agents are present in a solid form as well as expensive.

Figure 27:
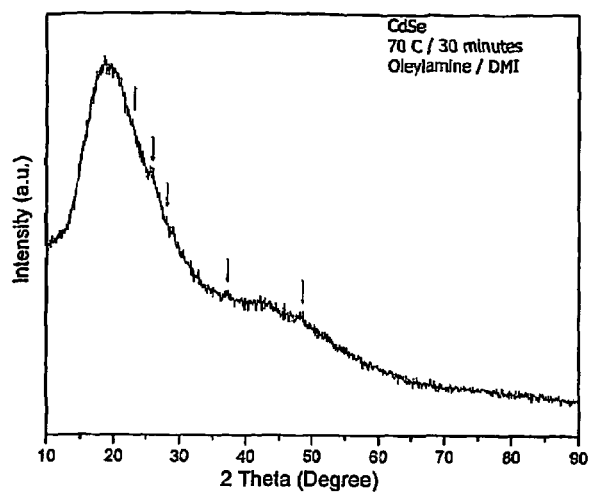
FIG. 27 shows the XRD pattern for CdSe in Oleylamine and DMI.

We found a new method to use various functional capping agents in a noncoordinating solvent. Instead of using the capping agents as a solvent where the CdSe formation takes place, we first dissolved a small amount of those capping agents in a solvent in the co-presence of cadmium and selenium sources in the solvent. The well mixed solution of the three chemical agents (the capping agent, a cadmium source compound, and a selenium source compound) was then heated to a proper temperature to initiate the reaction between cadmium and selenium ions. This method is exemplified by using oleylamine as a capping agent that was dissolved in DMI (1,3-dimethyl-2-imidazolidinone, 99%, Aldrich) solvent at about a 1:50 mole ratio. Neither $CdCl_2$ and $B_2Se_3$ could be dissolved in DMI without oleylamine. First, 0.15 g of $CdCl_2$ and 0.05 g of $B_2Se_3$ were dissolved separately in a 2.8 ml oleylamine/DMI solution. The resultant solutions were clear without any precipitates. The two solutions were then mixed thoroughly and heated at 70° C. for 30 minutes in a conventional oven. The initiation of the reaction was clearly visible as a significant amount of orange precipitate was rapidly formed at the temperature. The insolubility of the CdSe nanoparticles in DMI is reasonable because the outer ends of the oleylamine molecules are nonpolar when the CdSe nanoparticles are capped by the polar end of the amine molecules. FIG. 27 shows the XRD pattern of the CdSe. The Bragg reflection peaks are very weak. The arrows indicate the theoretical positions of the Bragg reflections of CdSe in a wurtzite structure. The broad peak around 43° corresponds to a Bragg reflection of a zinc-blend structure.

Figure 28:
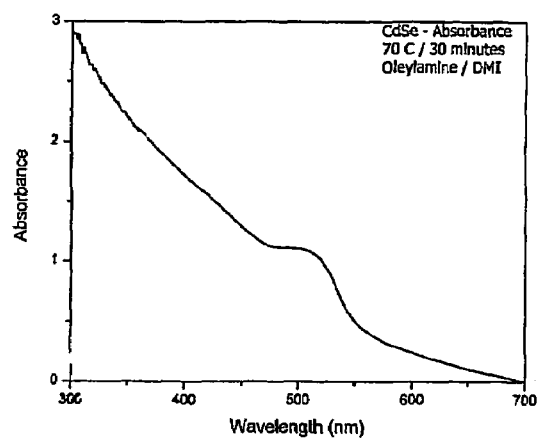
FIGS. 28A and 28B were obtained after a standard purification procedure.
Figure 28:
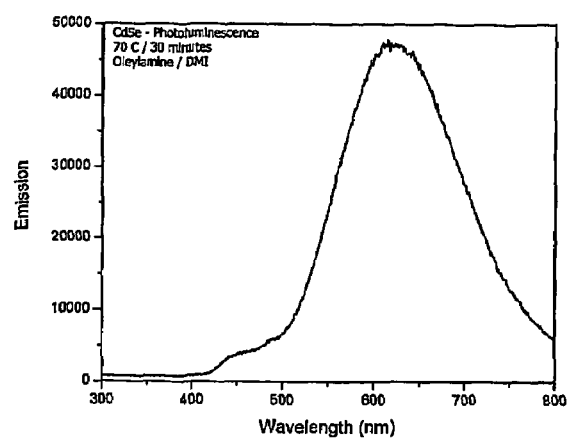

After a standard purification procedure, the optical properties of the CdSe sample were studied (FIGS. 28A and 28B). The spectra were measured using a 365 nm excitation wavelength. The peak found in the photoluminescence spectrum (FIG. 28B) is rather broad, indicating a wide size distribution. The maximum peak position corresponds to a particle size of 8 nm.

While the invention has been particularly shown and described with reference to specific preferred embodiments, it should be understood by those skilled in the art that various changes in form and detail may be made therein without departing from the spirit and scope of the invention as defined by the appended claims.

TABLE 1

The reaction conditions and results of the metal oxide sulfidation.[a]

| Starting Oxides | Loaded ratio (oxides:B:S) | Reaction temperature (°C.) | Products (Space Group) | Lattice parameters | Lattice parameters in the literature | Color of the product | Ref. |
|---|---|---|---|---|---|---|---|
| $TiO_2$ | 3:4:9 | 400 | $TiS_3$ ($P2_1/m$) | a = 4.957(5) | a = 4.958(2) | Grey | 14 |
| | | | | b = 3.397(4) | b = 3.401(2) | | |
| | | | | c = 8.788(8) | c = 8.778(4) | | |
| | | | | β = 97.23(5) | β = 97.32(4) | | |
| $TiO_2$ | 3:4:9 | 800 | $TiS_2$ (P-3m1) | a = b = 3.407(1) | a = b = 3.407(1) | Black | 15 |
| | | | | c = 5.703(1) | c = 5.695(1) | | |
| $V_2O_5$ | 3:10:24 | 350 | $VS_4$ (I2/c) | a = 6.782(3) | a = 6.775(5) | Black | 20 |
| | | | | b = 10.421(4) | b = 10.42(1) | | |
| | | | | c = 12.101(5) | c = 12.11(1) | | |
| | | | | β = 100.71(5) | β = 100.8(2) | | |
| $MnO_2$ | 3:4:6 | 550 | MnS (Fm-3m) | a = b = c = 5.221(1) | a = b = c = 5.22(1) | Black | 30 |
| $Fe_2O_3$ | 1:2:4 | 550 | $FeS_2$ (Pa-3) | a = b = c = 5.426(1) | a = b = c = 5.428(1) | Black | 25 |
| $Fe_3O_4$ | 3:8:18 | 550 | $FeS_2$ (Pa-3) | a = b = c = 5.421(1) | a = b = c = 5.428(1) | Black | 25 |
| NiO | 3:2:6 | 550 | $NiS_2$ (Pa-3) | a = b = c = 5.683(1) | a = b = c = 5.677(1) | Black | 26 |
| NbO | 3:2:9 | 550 | $NbS_3$ (P-1) | a = 4.961(6) | a = 4.963(2) | Black | 32 |
| | | | | b = 6.732(9) | b = 6.730(2) | | |
| | | | | c = 9.15(1) | c = 9.144(4) | | |
| | | | | β = 97.3(1) | β = 97.17(1) | | |
| $Nb_2O_5$ | 3:10:18 | 550 | $NbS_3$ (P-1) | a = 4.963(5) | a = 4.963(2) | Black | 32 |
| | | | | b = 6.728(6) | b = 6.730(2) | | |
| | | | | c = 9.144(9) | c = 9.144(4) | | |
| | | | | β = 97.2(1) | β = 97.17(1) | | |
| $MoO_2$ | 3:4:6 | 600 | $MoS_2$ ($P6_3/mmc$) | a = b = 3.162(3) | a = b = 3.160(1) | Black | 36 |
| | | | | c = 12.281(8) | c = 12.294(4) | | |
| $MoO_3$ | 1:2:2 | 600 | $MoS_2$ ($P6_3/mmc$) | a = b = 3.159(4) | a = b = 3.160(1) | Black | 36 |
| | | | | c = 12.284(1) | c = 12.294(4) | | |
| $RuO_2$ | 3:4:6 | 550 | $RuS_2$ (Pa-3) | a = b = c = 5.611(2) | a = b = c = 5.610(1) | Black | 27 |
| $WO_3$ | 1:2:2 | 600 | $WS_2$ ($P6_3/mmc$) | a = b = 3.154(4) | a = b = 3.153(1) | Grey | 37 |
| | | | | c = 12.33(1) | c = 12.323(5) | | |
| $Y_2O_3$ | 1:2:3 | 800 | $Y_2S_3$ ($P2_1/m$) | a = 17.50(1) | a = 17.523(1) | Light yellow | 42 |
| | | | | b = 4.007(2) | b = 4.011(1) | | |
| | | | | c = 10.183(4) | c = 10.174(1) | | |
| | | | | β = 98.62(4) | β = 98.60(1) | | |
| $Ce_2O_3$ | 1:2:4 | 550 | $CeS_2$($P2_1/c$) | a = 8.101(4) | a = 8.107 | Grayish yellow | 38 |
| | | | | b = 4.054(3) | b = 4.075 | | |
| | | | | c = 8.081(5) | c = 8.084 | | |
| | | | | β = 89.86(7) | β = 89.80 | | |
| $Nd_2O_3$ | 1:2:4 | 550 | $NdS_2$($P2_1/c$) | a = 8.028(5) | a = 8.015 | Grayish yellow | 38 |
| | | | | b = 4.002(2) | b = 4.012 | | |
| | | | | c = 8.001(5) | c = 7.988 | | |
| | | | | β = 90.00(1) | β = 90.0 | | |
| $Sm_2O_3$ | 1:2:4 | 550 | $SmS_2$($P4_2/n$) | a = b = 8.781(5) | a = b = 8.796 | Grayish yellow | 38 |
| | | | | c = 15.84(1) | c = 15.889 | | |
| $Eu_2O_3$ | 1:2:4 | 550 | $EuS_2$(P4/nmm) | a = b = 7.842(7) | a = b = 7.871 | Grayish yellow | 43 |
| | | | | c = 8.066(8) | c = 8.040 | | |
| $Tb_4O_7$ | 3:14:24 | 550 | $TbS_2$($P2_1/m$) | a = 3.871(2) | a = 3.872(1) | Grayish yellow | 44 |
| | | | | b = 3.865(2) | b = 3.860(1) | | |
| | | | | c = 7.880(4) | c = 7.887(1) | | |
| | | | | β = 90.05(5) | β = 90.1 1) | | |
| $Er_2O_3$ | 1:2:4 | 550 | $ErS_2$ (P4/nmm) | a = b = 7.649(5) | a = b = 7.636(1) | Grayish yellow | 39 |
| | | | | c = 7.827(7) | c = 7.811(6) | | |

[a]The JADE program was employed for X-ray powder diffraction pattern analysis and unit cell refinement.

The invention claimed is:

1. A method, comprising:
   providing a first material which includes at least one metal element;
   providing a second material, in powder form, which includes at least one chalcogen element;
   reacting the first and second materials together to provide a third material which includes a compound consisting of the chalcogen and metal elements; and
   wherein the second material includes a compound material of the chalcogen and at least one element selected from groups 13-15 of the periodic table of the elements.

2. The method of claim 1, wherein the first material includes a solvent.

3. The method of claim 1, wherein the second and third materials are provided in response to an amount of heat.

4. The method of claim 1, wherein the second and third materials are provided in response to first and second amounts of heat, respectively, the second amount of heat being greater than the first amount of heat.

5. The method of claim 1, wherein the second and third materials are provided in response to first and second amounts of heat, respectively, the second amount of heat being less than the first amount of heat.

6. A method, comprising:
   providing a first material which includes a metal element;
   providing a second material, in powder form, which includes a chalcogen element;
   providing a third material;
   providing a first amount of heat to form a fourth material from the second and third materials, the fourth material including the chalcogen element; and providing a second amount of heat to form a fifth material, the fifth material including a compound of the chalcogen and metal elements.

7. The method of claim 6, wherein the fifth material is formed in response to a reaction between the fourth materials and a metal material.

8. The method of claim 6, wherein the step of providing the second amount of heat also includes forming a sixth material which is a compound of the third material.

9. The method of claim 6, wherein the third material includes at least one element selected from groups 13-15 of the periodic table of the elements.

10. The method of claim 6, wherein the fifth material includes nanocrystals of the compound.

11. The method of claim 10, wherein at least a portion of the nanocrystals operate as a nanowire.

12. The method of claim 10, wherein the nanocrystals absorb a desired wavelength range of light.

13. The method of claim 10, wherein the dimensions, shape, composition, and/or absorption wavelength of the nanocrystals is adjustable in response to the first amount of heat, second amount of heat, the type of metal element, the concentration of the metal element, the type of chalcogen element, and/or the concentration of the chalcogen element.

14. A method, comprising:
providing a first material which includes a metal element;
providing a chalcogen material, in powder form, which includes a chalcogen element;
providing a second material which is reactive with the chalcogen material;
reacting the chalcogen and second materials together to form a third material; and
reacting the first and third materials together to form a fourth material, the fourth material including a compound of the chalcogen and metal.

15. The method of claim 14, wherein the second material includes at least one element selected from groups 13-15 of the periodic table of the elements.

16. The method of claim 14, wherein the third material includes a compound of the chalcogen element and second materials.

17. The method of claim 14, wherein the first material includes a solvent.

18. The method of claim 14, wherein the chalcogen and second materials are reacted at a first temperature for a first time and the first and third materials are reacted at a second temperature for a second time, wherein the second temperature is less than the first temperature.

19. The method of claim 18, wherein fourth material includes nanocrystals, the dimensions, composition, and/or absorption wavelength of the nanocrystals being adjustable in response to at least one of the first temperature, second temperature, first time, and second time.

* * * * *